United States Patent
Ho et al.

(10) Patent No.: US 9,963,249 B2
(45) Date of Patent: May 8, 2018

(54) EFFICIENT STATIONKEEPING DESIGN FOR MIXED FUEL SYSTEMS IN RESPONSE TO A FAILURE OF AN ELECTRIC THRUSTER

(71) Applicant: The Boeing Company, Chicago, IL (US)

(72) Inventors: Yiu-Hung Monte Ho, Palos Verdes Estates, CA (US); Jeffrey Scott Noel, Torrance, CA (US); Andrew Henry Giacobe, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 14/753,690

(22) Filed: Jun. 29, 2015

(65) Prior Publication Data
US 2016/0376035 A1 Dec. 29, 2016

(51) Int. Cl.
*B64G 1/24* (2006.01)
*B64G 1/26* (2006.01)

(52) U.S. Cl.
CPC ............... *B64G 1/26* (2013.01); *B64G 1/242* (2013.01)

(58) Field of Classification Search
CPC ...................................................... B64G 1/24
See application file for complete search history.

(56) References Cited

U.S. PATENT DOCUMENTS

| 5,446,465 A * | 8/1995 | Diefes ............... G01C 21/00 342/352 |
| 5,851,309 A * | 12/1998 | Kousa ............... F24J 2/0444 126/578 |
| 5,984,236 A * | 11/1999 | Keitel ............... B64G 1/24 244/164 |
| 6,015,116 A | 1/2000 | Anzel et al. |
| 6,135,394 A * | 10/2000 | Kamel ............... B64G 1/242 244/158.8 |
| 7,918,420 B2 | 4/2011 | Ho |
| 2014/0361123 A1 | 12/2014 | Celerier |
| 2016/0376033 A1* | 12/2016 | Ho ............... B64G 1/409 244/158.6 |

FOREIGN PATENT DOCUMENTS

| EP | 0818721 A1 | 1/1998 |
| EP | 0937644 A2 | 8/1999 |
| EP | 2786893 A2 | 10/2014 |
| EP | 2810875 A2 | 12/2014 |

* cited by examiner

*Primary Examiner* — Jessica B Wong
(74) *Attorney, Agent, or Firm* — Duft Bornsen & Fettig LLP

(57) ABSTRACT

Apparatus and methods for stationkeeping in a satellite. The satellite includes a north electric thruster and a south electric installed on a zenith side, an east chemical thruster installed on an east side, and a west chemical thruster installed on a west side. An orbit controller detects a failure of one of the electric thrusters. In response to the failure, the orbit controller controls a burn of the remaining electric thruster proximate to an orbital node. The orbit controller controls a burn of one of the chemical thrusters at 90°±5° from the burn of the remaining electric thruster, and controls a burn of the other one of the chemical thrusters at 270°±5° from the burn of the remaining electric thruster.

18 Claims, 20 Drawing Sheets

EFFICIENT STATIONKEEPING DESIGN FOR MIXED FUEL SYSTEMS IN RESPONSE TO A FAILURE OF AN ELECTRIC THRUSTER

FIELD

This disclosure relates to the field of satellites, and more particularly, to stationkeeping for satellites.

BACKGROUND

A geosynchronous satellite is a satellite that orbits the Earth and follows the direction of the Earth's rotation. One revolution of a geosynchronous satellite around the Earth takes about 24 hours, which is the same amount of time it takes for the Earth to rotate once about its axis. These types of satellites are considered geosynchronous because they appear stationary when viewed from a particular location on the Earth, and are commonly used as communication satellites.

The geosynchronous satellites have assigned orbits above the Earth's equator so they do not collide with one another or interfere with each other's communications. Geosynchronous satellites orbit at a radius of about 42,164 kilometers from the center of the Earth. Satellites at this radius make one revolution around the Earth in about 24 hours (a sidereal day) due to the gravitational force of the Earth. The orbit for a satellite may be affected by perturbations, such as gravitational forces from the Sun and Moon, the non-circular shape of the Earth, solar radiation pressure, etc. To negate the perturbations and keep a satellite in its assigned orbit, propulsion systems on the satellite perform active maneuvers that are referred to as "stationkeeping" maneuvers. When observed from a location on the Earth, the position of a satellite is maintained within an assigned orbital station or "box" which has predetermined dimensions. Stationkeeping involves control of the satellite's longitude, the eccentricity of its orbit, and the inclination of its orbital plane from the Earth's equatorial plane.

An example of stationkeeping is described in U.S. Pat. No. 6,015,116, which issued on Jan. 18, 2000. The propulsion system described in '116 uses four thrusters that are diagonally arranged on the back (zenith) side of the satellite. One pair of the thrusters have thrust lines directed through the center of mass of the satellite, while the other pair have thruster forces that are spaced by momentum arms from the center of mass. Another example of stationkeeping is described in U.S. Pat. No. 7,918,420, which issued on Apr. 5, 2011. Both of the patents are incorporated by reference as if fully included herein.

It is desirable to identify new and improved stationkeeping maneuvers that are effective yet fuel efficient.

SUMMARY

Embodiments described herein provide stationkeeping maneuvers for a satellite when an electric thruster fails. A satellite as discussed herein includes a satellite bus having a nadir side configured to face the Earth and a zenith side opposite the nadir side. A north electric thruster is installed toward a north region of the zenith side and oriented downward to produce thrust through a center of mass of the satellite. A south electric thruster is installed toward a south region of the zenith side and oriented upward to produce thrust through the center of mass of the satellite. The satellite also includes chemical thrusters. An east chemical thruster is installed on an east side of the satellite bus to produce thrust through the center of mass of the satellite, and a west chemical thruster is installed on a west side of the satellite bus to produce thrust through the center of mass of the satellite.

The thrusters discussed above are used for stationkeeping maneuvers. However, if one of the electric thrusters fails, then that electric thruster will not be available for the maneuvers. One embodiment described herein includes an orbit controller that is able to control stationkeeping maneuvers for the satellite in response to a failure of an electric thruster. Upon detecting the failure, the orbit controller controls a burn of the remaining electric thruster at an orbital node (e.g., ascending or descending). The orbit controller also controls a burn of one of the chemical thrusters at $90°±5°$ from the burn of the remaining electric thruster, and controls a burn of the other one of the chemical thrusters at $270°±5°$ from the burn of the remaining electric thruster.

In a failure scenario such as this, only one electric thruster is available. The burn of the remaining electric thruster at its orbital node produces a radial velocity change of the satellite. The radial velocity change produces a delta-eccentricity ($\Delta e$) component for the orbit of the satellite due to the burn of the remaining electric thruster. The burn of one chemical thruster at $90°±5°$ produces a first tangential velocity change of the satellite, which in turn produces a $\Delta e$ component due to the burn of this chemical thruster. The burn of the other chemical thruster at $270°±5°$ produces a second tangential velocity change of the satellite, which in turn produces a $\Delta e$ component due to the burn of the other chemical thruster. The $\Delta e$ components due to the burns of the chemical thrusters compensate for the $\Delta e$ component due to the burn of the remaining electric thruster.

For example, if the burn of the remaining electric thruster is at or near right ascension of 270°, then this burn produces a $\Delta e$ component that points substantially along the x-axis of a geocentric coordinate system. The burns of the chemical thrusters at or near right ascension of 0° and right ascension of 180° can produce a $\Delta e$ component that points substantially along the x-axis in the opposite direction than the $\Delta e$ component produced by the remaining electric thruster. The maneuvers of the chemical thrusters compensate for the residual eccentricity produced by a burn of an electric thruster at only one of the orbital nodes. Therefore, the satellite can be kept in-station even though one of the electric thrusters has failed.

In one embodiment, the orbit controller is configured to detect a failure of the north electric thruster, to control a burn of the south electric thruster proximate to a descending node, to control a retrograde burn of the east chemical thruster at $90°±5°$ from the burn of the south electric thruster, and to control a prograde burn of the west chemical thruster at $270°±5°$ from the burn of the south electric thruster.

In another embodiment, the orbit controller is configured to detect a failure of the south electric thruster, to control a burn of the north electric thruster proximate to an ascending node, to control a retrograde burn of the east chemical thruster at $90°±5°$ from the burn of the north electric thruster, and to control a prograde burn of the west chemical thruster at $270°±5°$ from the burn of the north electric thruster.

Other stationkeeping maneuvers may be used further to compensate for perturbations during a failure scenario. In one embodiment, an orbit controller is configured to detect a failure of one of the electric thrusters. In response to the failure, the orbit controller is configured to control a burn of the remaining electric thruster proximate to an orbital node which produces a radial velocity change of the satellite. The radial velocity change produces a $\Delta e$ component for the orbit of the satellite due to the burn of the remaining electric thruster. The orbit controller is configured to determine a Δe component due to perturbations affecting the orbit of the satellite. The orbit controller is configured to control a burn of the east chemical thruster at a first location along the orbit of the satellite which produces a first tangential velocity change of the satellite. The first tangential velocity change produces a Δe component due to the burn of the east chemical thruster. The orbit controller is configured to control a burn of the west chemical thruster at a second location along the orbit of the satellite which produces a second tangential velocity change of the satellite. The second tangential velocity change produces a Δe component due to the burn of the west chemical thruster. The orbit controller is configured to select the first location of the burn of the east chemical thruster and the second location of the burn of the west chemical thruster so that the Δe component due to the burn of the east chemical thruster and the Δe component due to the burn of the west chemical thruster compensate for the Δe component due to the burn of the remaining electric thruster and the Δe component due to the perturbations.

In one embodiment, the orbit controller is configured to determine a position of the Sun based on time of year, and to determine the Δe component due to perturbations based on the position of the Sun.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
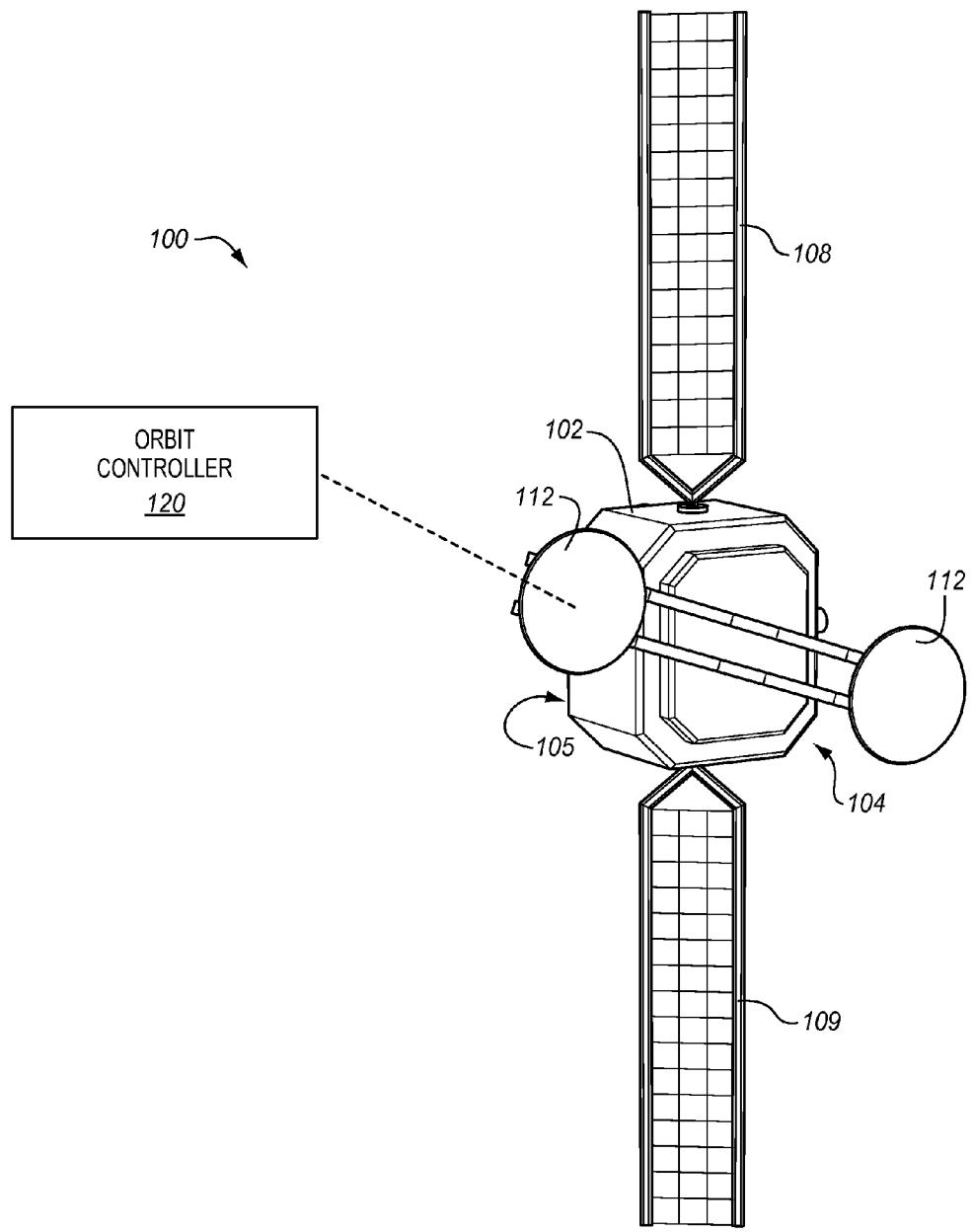
FIG. 1 illustrates a satellite in an exemplary embodiment.

FIG. 1 illustrates a satellite 100 in an exemplary embodiment. Satellite 100 includes a main body that carries the payload of the satellite, which is referred to as a satellite bus 102. When viewed from the Earth, satellite bus 102 includes a nadir side 104 (or front side) and an opposing zenith side 105 (or back side). The terms "side" or "face" may be used interchangeably when discussing satellite bus 102. Satellite 100 also includes solar wings 108-109 that are attached to satellite bus 102, and may be used to derive electricity from the Sun to power different components on satellite 100. Satellite 100 also includes one or more antennas 112 that may be used for communications. The structure of satellite 100 shown in FIG. 1 is an example, and may vary as desired.

Satellite 100 is configured to orbit around the Earth, such as in a geosynchronous orbit. To keep satellite 100 in its assigned orbit, an orbit controller 120 is coupled to satellite 100. Orbit controller 120 comprises devices, components, or modules (including hardware, software, or a combination of hardware and software) that control stationkeeping maneuvers for satellite 100. Orbit controller 120 may be located on Earth, and able to communicate with satellite 100 over wireless signals. Orbit controller 120 may alternatively be located on satellite 100. Orbit controller 120 may also be modularized with a portion of orbit controller 120 located on Earth, and a portion located locally on satellite 100.

Figure 2:
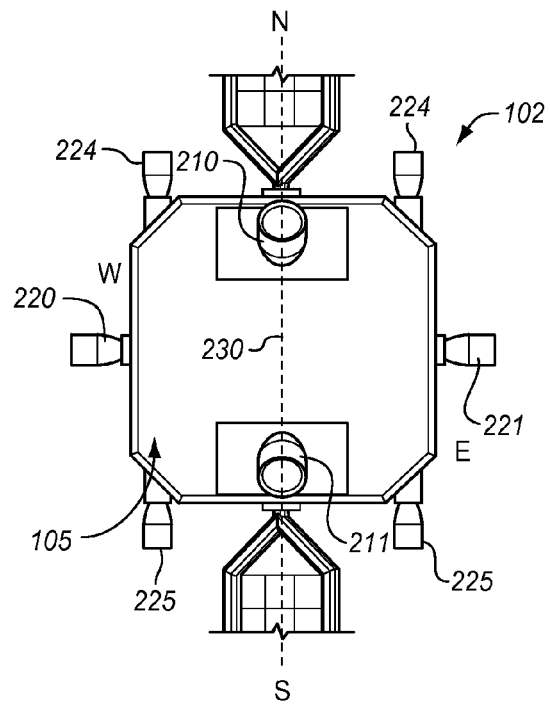
FIG. 2 illustrates the zenith side of a satellite bus in an exemplary embodiment.

Satellite 100 includes a propulsion system that is used for stationkeeping maneuvers. FIG. 2 illustrates the zenith side 105 of satellite bus 102 in an exemplary embodiment. The top side of satellite bus 102 is referred to as the north side (indicated by "N"), and the bottom side of satellite bus 102 is referred to as the south side (indicated by "S"). The left side of satellite bus 102 in FIG. 2 is referred to as the west side (indicated by "W"), and the right side of satellite bus 102 in FIG. 2 is referred to as the east side (indicated by "E"). The zenith side 105 of satellite bus 102 includes a pair of electric thrusters 210-211 that are part of the propulsion system. An electric thruster is a type of thruster that produces electric thrust by accelerating ions. In a typical electric thruster, a propellant (e.g., xenon) is injected into an ionization chamber and ionized by electron bombardment. The ions are then accelerated by an electromagnetic field, and emitted from the thruster as exhaust that produces thrust. One example of an electric thruster is a Xenon Ion Propulsion System (XIPS©) manufactured by L-3 Communications of Aurora, Colo.

Electric thruster 210 is installed toward a north region of the zenith side 105, and is referred to herein as the north electric thruster. Electric thruster 211 is installed toward a south region of the zenith side 105, and is referred to herein as the south electric thruster. In this embodiment, north electric thruster 210 and south electric thruster 211 are centered on the zenith side 105 along the north-south axis 230 of satellite bus 102. In other embodiments, north electric thruster 210 and south electric thruster 211 may be off center.

Figure 3:
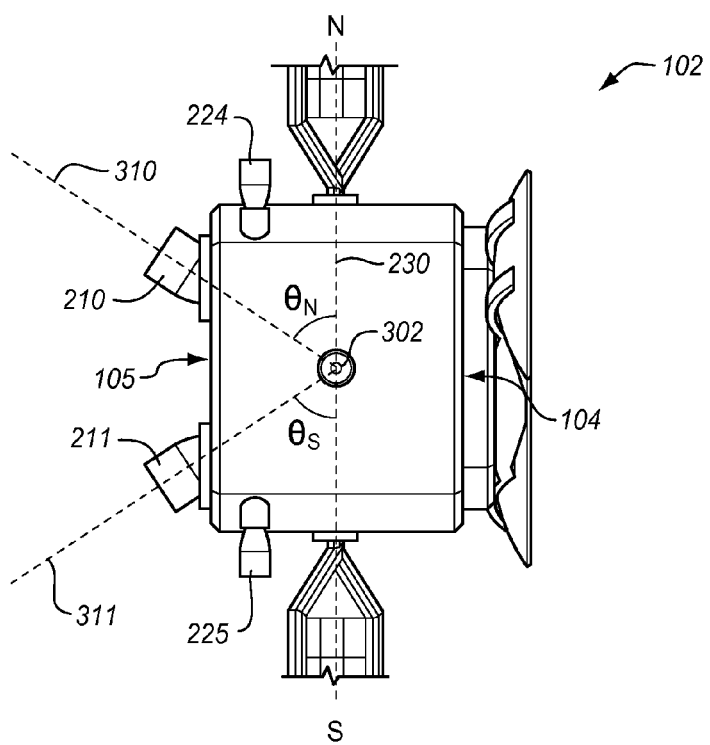
FIG. 3 is a side view of a satellite bus in an exemplary embodiment.

FIG. 3 is a side view of satellite bus 102 in an exemplary embodiment. North electric thruster 210 is oriented or tilted downward to produce thrust through the center of mass 302 of satellite 100. Line 310 represents the thrust line of north electric thruster 210 that passes through the center of mass 302. The orientation of north electric thruster 210 forms a cant angle $\theta_N$ between the thrust line 310 and the north-south axis 230 of satellite bus 102. The cant angle $\theta_N$ may be 35°±25°. North electric thruster 210 may be fixed at a desired angle, or may be gimbaled so that orbit controller 120 can adjust the cant angle $\theta_N$ of north electric thruster 210 as desired. Due to the orientation of north electric thruster 210, it is able to generate thrust in the south direction (downward in FIG. 3), and radially toward the Earth.

South electric thruster 211 is oriented or tilted upward to produce thrust through the center of mass 302 of satellite 100. Line 311 represents the thrust line of south electric thruster 211 that passes through the center of mass 302. The orientation of south electric thruster 211 forms a cant angle $\theta_S$ between the thrust line 311 and the north-south axis 230 of satellite bus 102. The cant angle $\theta_S$ may be 35°±25°. South electric thruster 211 may be fixed at a desired angle, or may be gimbaled so that orbit controller 120 can adjust the cant angle $\theta_S$ of south electric thruster 211 as desired. Due to the orientation of south electric thruster 211, it is able to generate thrust in the north direction (upward in FIG. 3), and radially toward the Earth.

The number or positions of electric thrusters 210-211 as shown in FIGS. 2-3 provide an exemplary configuration. The stationkeeping maneuvers discussed herein apply to any configuration where electric thrusters produce an out-of-plane velocity change (or normal velocity change) and a radial velocity change.

In FIG. 2, a chemical thruster 220 is installed on the west side of satellite bus 102, and a chemical thruster 221 is installed on the east side of satellite bus 102. A chemical thruster is a type of thruster that burns liquid propellant to produce thrust. One type of chemical thruster is referred to as a bipropellant (or biprop) thruster that burns a liquid fuel and a liquid oxidizer in a combustion chamber. Chemical thruster 220 may be centered on the west side of satellite bus 102 to produce thrust through the center of mass 302 of satellite 100 (see FIG. 3). Likewise, chemical thruster 221 may be centered on the east side of satellite bus 102 to produce thrust through the center of mass 302 of satellite 100.

In one embodiment, chemical thrusters 224 may be installed on the north side of satellite bus 102, and chemical thrusters 225 may be installed on the south side of satellite bus 102. The north and south chemical thrusters 224-225 are optional. If north and south chemical thrusters 224-225 are installed, their location may vary depending on antennas, solar panels, and other payload that is attached to the north and south sides of satellite bus 102.

The propulsion system of satellite 100 may include other thrusters not shown in FIGS. 2-3. For example, a redundant electric thruster may be installed on the north region of the zenith side 105 in case north electric thruster 210 fails. Similarly, a redundant electric thruster may be installed on the south region of the zenith side 105 in case south electric thruster 211 fails. Additional chemical thrusters may also be installed on the zenith side 105, and any combination of the north, south, east, and west sides. Because thrusters and the propellant are expensive, it may be desirable to reduce the number of thrusters used for stationkeeping maneuvers, and to reduce the number of maneuvers performed during stationkeeping.

Figure 4:
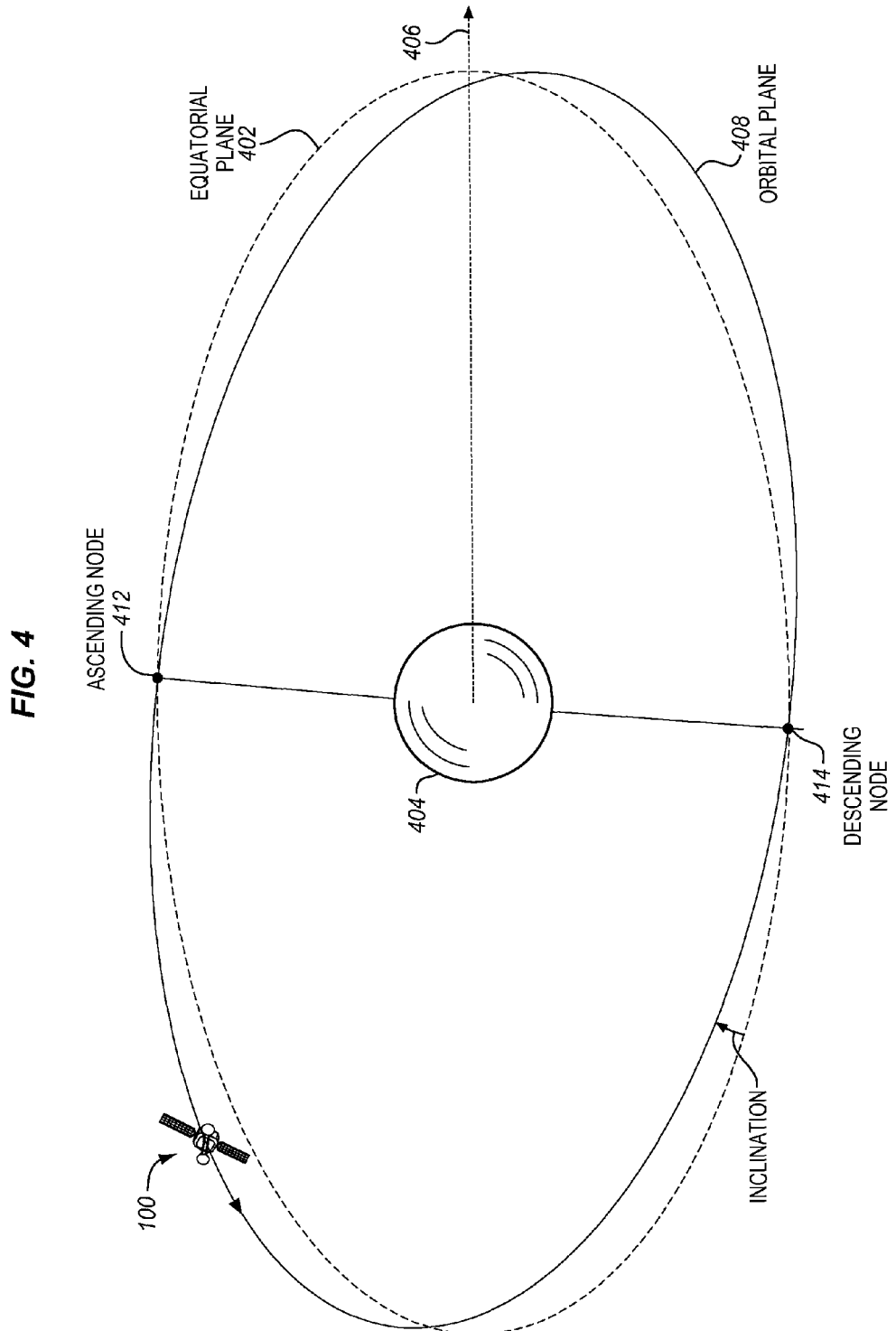
FIG. 4 illustrates an orbit of a satellite in an exemplary embodiment.

FIG. 4 illustrates an orbit of satellite 100 in an exemplary embodiment. The dotted ellipse represents the equatorial plane 402 of the Earth 404, which is the plane that passes through the equator of the Earth 404. The dotted arrow represents the First Point of Aries 406 where the equatorial plane passes the center of the Sun. The solid ellipse represents the orbital plane 408 of satellite 100 as it orbits the Earth 404.

If the Earth 404 was a perfect sphere and was isolated from other bodies in the solar system, then the orbit of a satellite would be an ellipse of a constant size and shape in a plane whose direction would remain fixed. However, different forces perturb the orbit of satellite 100, which causes the shape of the orbit to change and the orientation of the orbital plane 408 to differ from the equatorial plane 402. For example, gravitational forces of the Sun and Moon, the non-spherical shape of the Earth 404, solar radiation pressure, etc., can affect the orbit of satellite 100. Perturbations may cause the orbital plane 408 of satellite 100 to tilt in relation to the equatorial plane 402, which is referred to as inclination. Inclination is an orbital element that describes the angle between the orbital plane of a satellite and the equatorial plane. When the orbital plane 408 tilts in relation to the equatorial plane 402, the relationship between the orbital plane 408 and the equatorial plane 402 may be described by its orbital nodes. The ascending node is where the orbital plane 408 intersects the equatorial plane 402 going from south to north. In FIG. 4, the ascending node 412 is about 90° from the First Point of Aries 406. The descending node is where the orbital plane 408 intersects the equatorial plane 402 going from north to south. In FIG. 4, the descending node 414 is about 270° from the First Point of Aries 406, or 180° from the ascending node 412.

Perturbations may also cause the orbit of satellite 100 to be more elliptical than circular, which is referred to as eccentricity. Eccentricity is an orbital element that indicates the deviation of an orbit from a circle. An eccentricity value of 0 indicates a circular orbit, and values between 0 and 1 describe an elliptical orbit. The eccentricity of an orbit may be characterized by an eccentricity vector, which is a vector that points towards perigee and has a magnitude equal to the orbit's scalar eccentricity (the magnitude is between 0 and 1, and is unitless). When an orbit has eccentricity greater than 0, the shape of the orbit becomes elliptical around the Earth rather than circular. For an elliptical orbit, the longest and shortest lines that can be drawn through the center of an ellipse are called the major axis and minor axis, respectively. The semi-major axis is one-half of the major axis, and represents a mean distance from the satellite to the Earth. Perigee is the point in the orbit closest to the Earth, and opposite of perigee is apogee, which is the farthest point in the orbit from the Earth. When describing an elliptical orbit, the eccentricity vector points at perigee, and has a magnitude equal to the eccentricity (e) of the ellipse (0<e<1).

Figure 5:
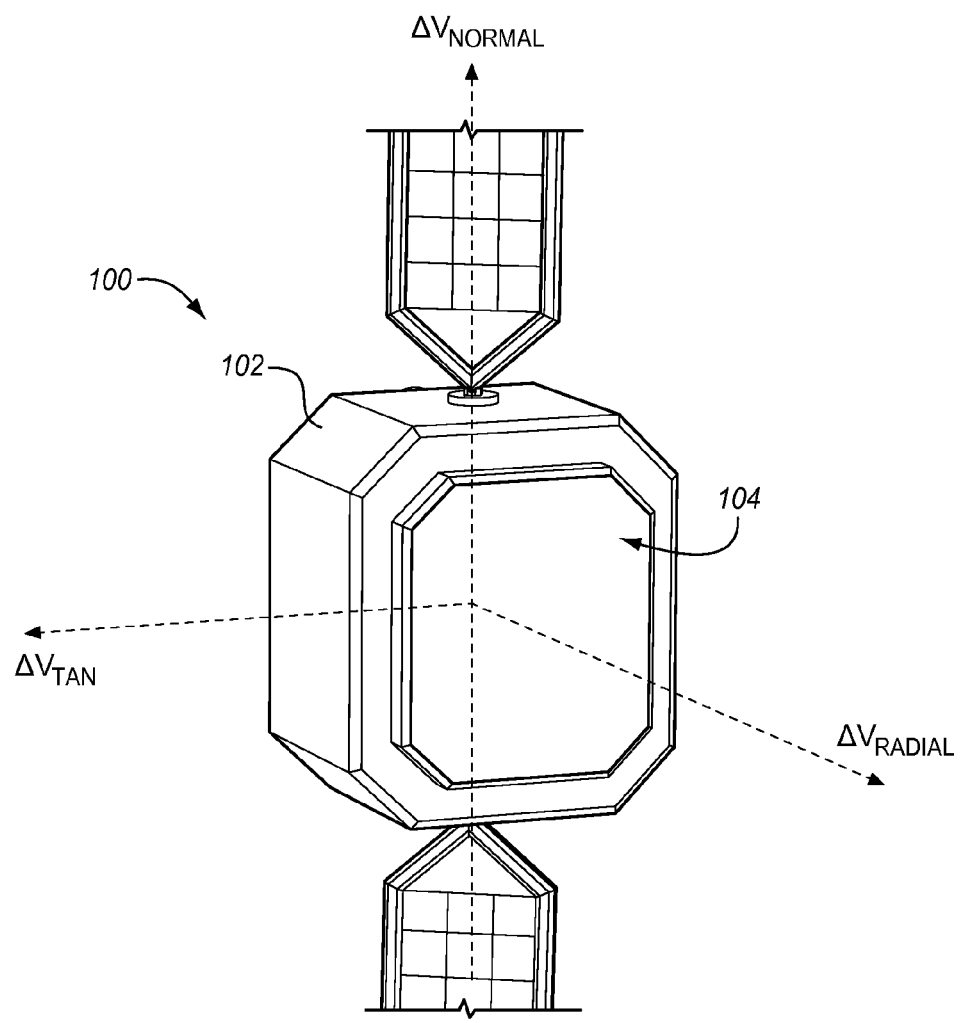
FIG. 5 illustrates velocity vectors resulting from thruster burns in an exemplary embodiment.

The embodiments below describe stationkeeping maneuvers that compensate for inclination and eccentricity of the satellite's orbit. Stationkeeping maneuvers involve burns of one or more thrusters of satellite 100 as it orbits the Earth 404. A burn of a thruster creates or produces a change in velocity ($\Delta V$) of satellite 100. FIG. 5 illustrates velocity vectors resulting from thruster burns in an exemplary embodiment. Thruster burns can produce a $\Delta V$ in a normal direction, a tangential direction, and/or a radial direction. The normal direction is out of the orbital plane of satellite 100, the tangential direction is in the direction of travel of satellite 100 along its orbit, and the radial direction is toward the Earth 404. Although the electric thrusters 210-211 are not visible in FIG. 5, a burn of the north electric thruster 210 will produce a $\Delta V$ in the radial direction ($\Delta V_{radial}$) and the normal direction ($\Delta V_{normal}$) due to its cant angle (see FIG. 3). A burn of the south electric thruster 211 will produce a $\Delta V$ in the radial direction and the normal direction due to its cant angle (see FIG. 3). A burn of the west chemical thruster 220 or the east chemical thruster 221 will produce a $\Delta V$ in the tangential direction ($\Delta V_{tan}$).

A $\Delta V$ in the normal direction may be used to compensate for inclination of the orbital plane 408 (see FIG. 4). Maneuvers at or proximate to the orbital nodes provide for the most effective compensation for inclination. For example, a burn of the north electric thruster 210 proximate to ascending node 412 produces a $\Delta V$ in the normal direction, and a burn of the south electric thruster 211 proximate to descending node 414 also produces a $\Delta V$ in the normal direction. The total $\Delta V_{normal}$ compensates for inclination of the orbital plane 408. Each of these burns also produces a $\Delta V$ in the radial direction. When the duration of the burns are equal, the $\Delta V_{radial}$ produced at ascending node 412 and at descending node 414 cancel each other so that there is no net $\Delta V_{radical}$.

Electric thrusters 210-211 are effectively used to compensate for inclination in this manner, but are not traditionally used to compensate for eccentricity of the satellite's orbit. The embodiments described herein use the electric thrusters 210-211 to compensate for eccentricity in addition to inclination.

Figure 6:
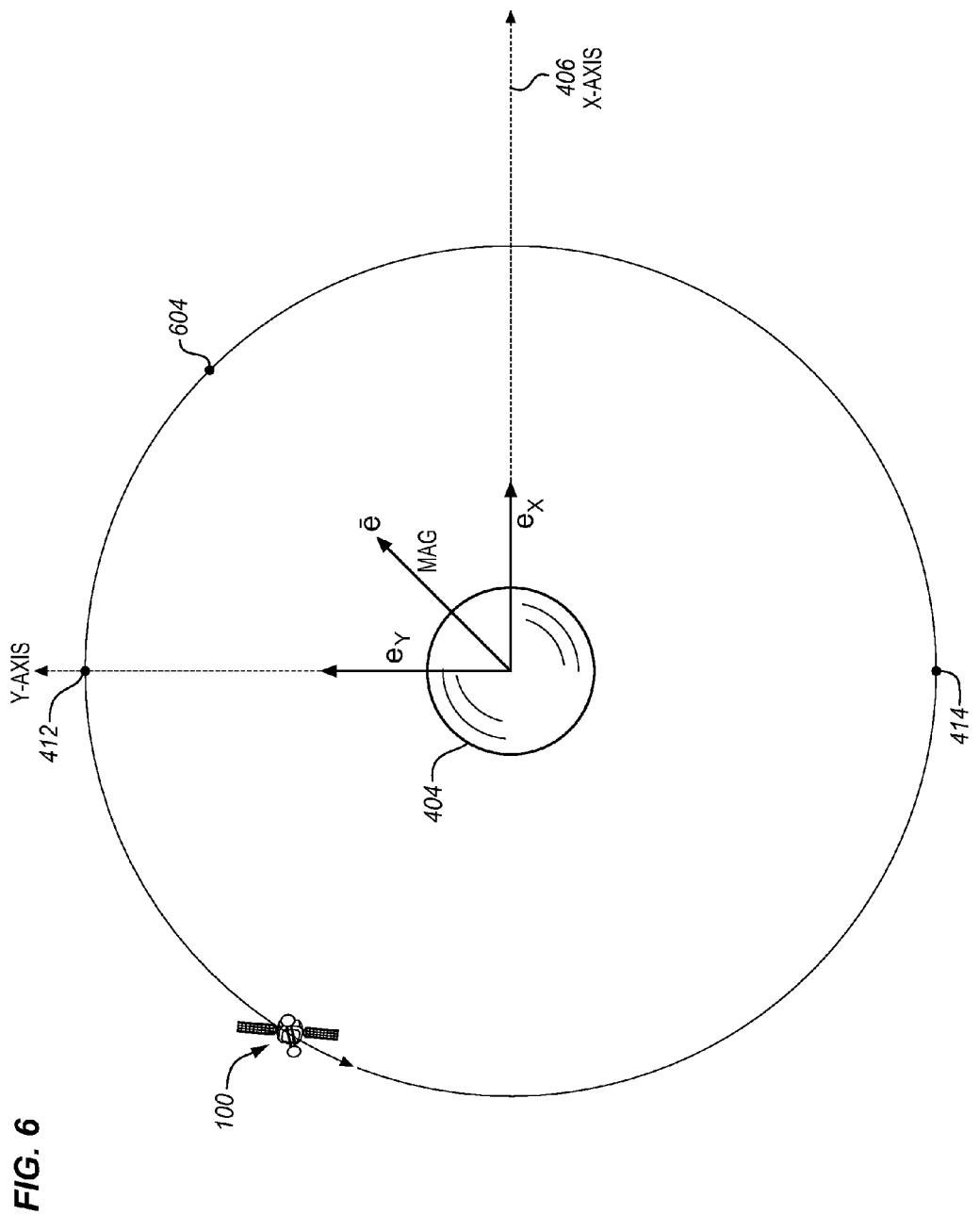
FIG. 6 illustrates eccentricity of a satellite's orbit.

FIG. 6 illustrates eccentricity of the orbit for satellite 100. The orbit of satellite 100 in FIG. 6 is shown in a geocentric coordinate system as an example. The x-axis (or K1-axis) corresponds with the First Point of Aries 406, and the y-axis (or H1-axis) is shown as 90° from the x-axis. The z-axis for a geocentric coordinate system would be north-south along the poles of the Earth 404, which is into and out of the page in FIG. 6. The eccentricity of an orbit may be represented by an eccentricity vector. The eccentricity vector (ē) includes an x-component ($e_X$) along the x-axis and a y-component ($e_Y$) along the y-axis. The eccentricity vector points at perigee 604, and has a magnitude MAG.

Figure 7:
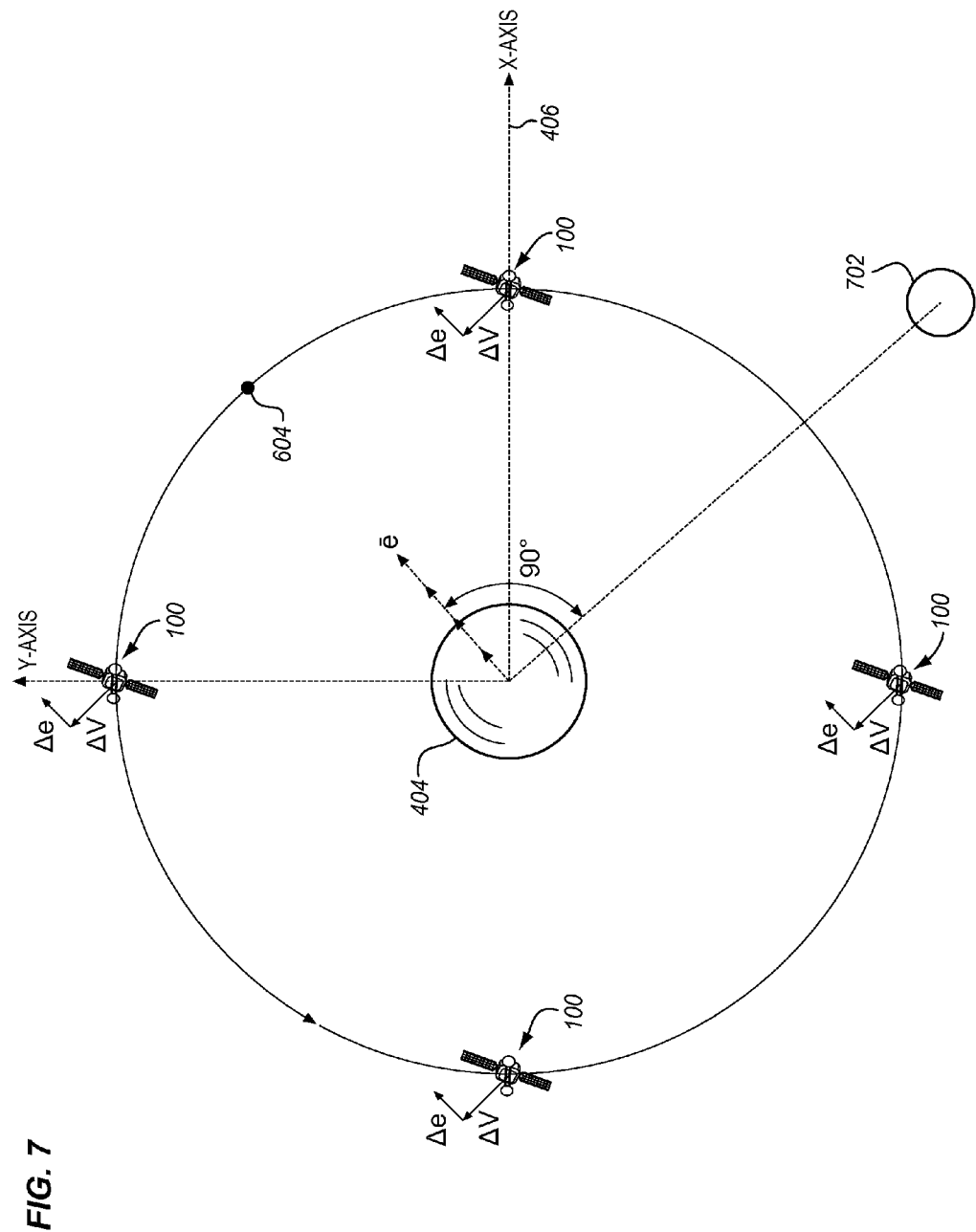
FIG. 7 illustrates eccentricity caused by solar radiation pressure.

The eccentricity shown in FIG. 6 may be caused by solar radiation pressure and/or other perturbations. FIG. 7 illustrates eccentricity caused by solar radiation pressure. In a geocentric model, the position of the Sun 702 depends on the time of year. For example, at the vernal equinox, the Sun 702 will be at the First Point of Aries 406, which is 0°. Over a year, the Sun 702 will "orbit" the Earth 404 about 1° per day (360°÷365 days≈1°/day). The Sun 702 is illustrated at about 300° in FIG. 7. The solar radiation pressure from the Sun 702 pushes on satellite 100 as it orbits. This pressure will create a $\Delta V$ in a direction away from the Sun 702. FIG. 7 illustrates a $\Delta V$ produced at four different orbital positions, but it is understood that the pressure can affect the satellite 100 along the entire orbit.

A change in velocity ($\Delta V$) of satellite 100 produces a change in eccentricity ($\Delta e$) that is orthogonal to the $\Delta V$. As shown in FIG. 7, each $\Delta V$ results in a corresponding $\Delta e$ component that points 90° behind the $\Delta V$. The $\Delta e$ components add to produce the eccentricity vector for the orbit caused by solar radiation pressure. As can be seen in FIG. 7, the eccentricity caused by solar radiation pressure points 90° ahead of the Sun 702. Thus, perigee for the satellite's orbit will lead the Sun 702 by 90°. If the Sun 702 were at zero degrees (around March $21^{st}$), then the eccentricity caused by solar radiation pressure would point to 90°. If the Sun 702 were at 90°, then the eccentricity caused by solar radiation pressure would point to 180°. If the Sun 702 were at 180° (around September $21^{st}$), then the eccentricity caused by solar radiation pressure would point to 270°. If the Sun were at 270°, then the eccentricity caused by solar radiation pressure would point to 0°.

Figure 8:
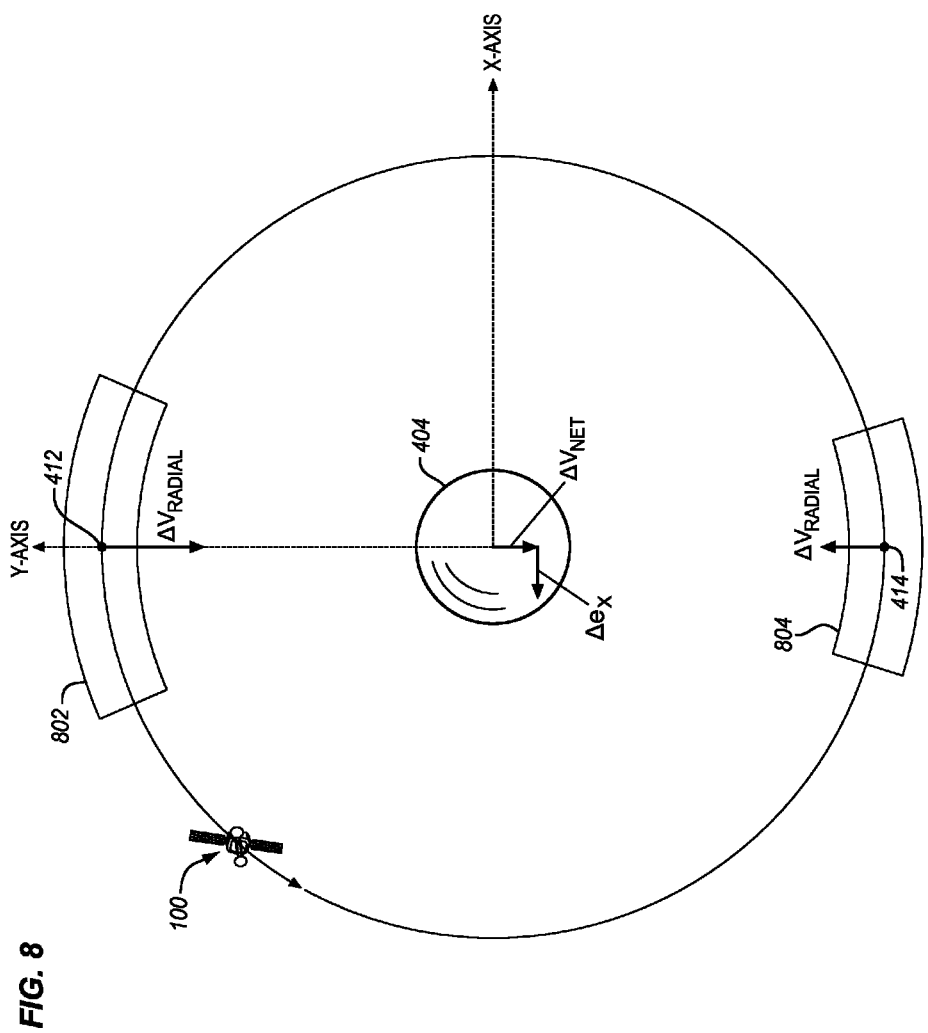
FIG. 8 illustrates a difference in burn durations proximate to an ascending node and a descending node in an exemplary embodiment.

The stationkeeping maneuvers described herein are able to compensate for eccentricity caused by solar radiation pressure and other perturbations. The stationkeeping maneuvers produce a target $\Delta e$ in a direction opposite the eccentricity caused by solar radiation pressure and other perturbations. To produce the target $\Delta e$, the duration of the burn proximate to the ascending node 412 differs from the duration of the burn proximate to the descending node 414. FIG. 8 illustrates a difference in burn durations proximate to the ascending node 412 and the descending node 414 in an exemplary embodiment. In this embodiment, a burn duration 802 of the north electric thruster 210 is shown proximate to the ascending node 412, and a burn duration 804 of the south electric thruster 211 is shown proximate to the descending node 414. The total or combined burn time of thrusters 210-211 is determined at least in part to compensate for the inclination of the orbital plane 408. The difference in burn durations 802 and 804 produces a $\Delta e$ component along the x-axis. For example, if the total burn time is 6 hours, then burn duration 802 may be apportioned at 4 hours while burn duration 804 may be apportioned at 2 hours. The burn of the north electric thruster 210 creates a $\Delta V_{radial}$ that is greater than the $\Delta V_{radial}$ created by the burn of the south electric thruster 211. The net $\Delta V_{radial}$ produced by the two maneuvers is substantially along the y-axis and results in a $\Delta e$ component along the x-axis. The radial velocities would cancel if the burns were of the same duration. When there is a difference between the burn durations of the north electric thruster 210 and the south electric thruster 211, the $\Delta V_{radial}$ at the orbital nodes do not cancel and a net $\Delta V_{radial}$ remains. In the example shown in FIG. 8, the magnitude of the $\Delta V_{radial}$ at the ascending node 412 is greater than the magnitude of the $\Delta V_{radial}$ at the descending node 414 because the burn duration is longer at the ascending node 412. The difference in burn durations at the two orbital nodes results in a $\Delta e$ component along the negative x-axis.

Figure 9:
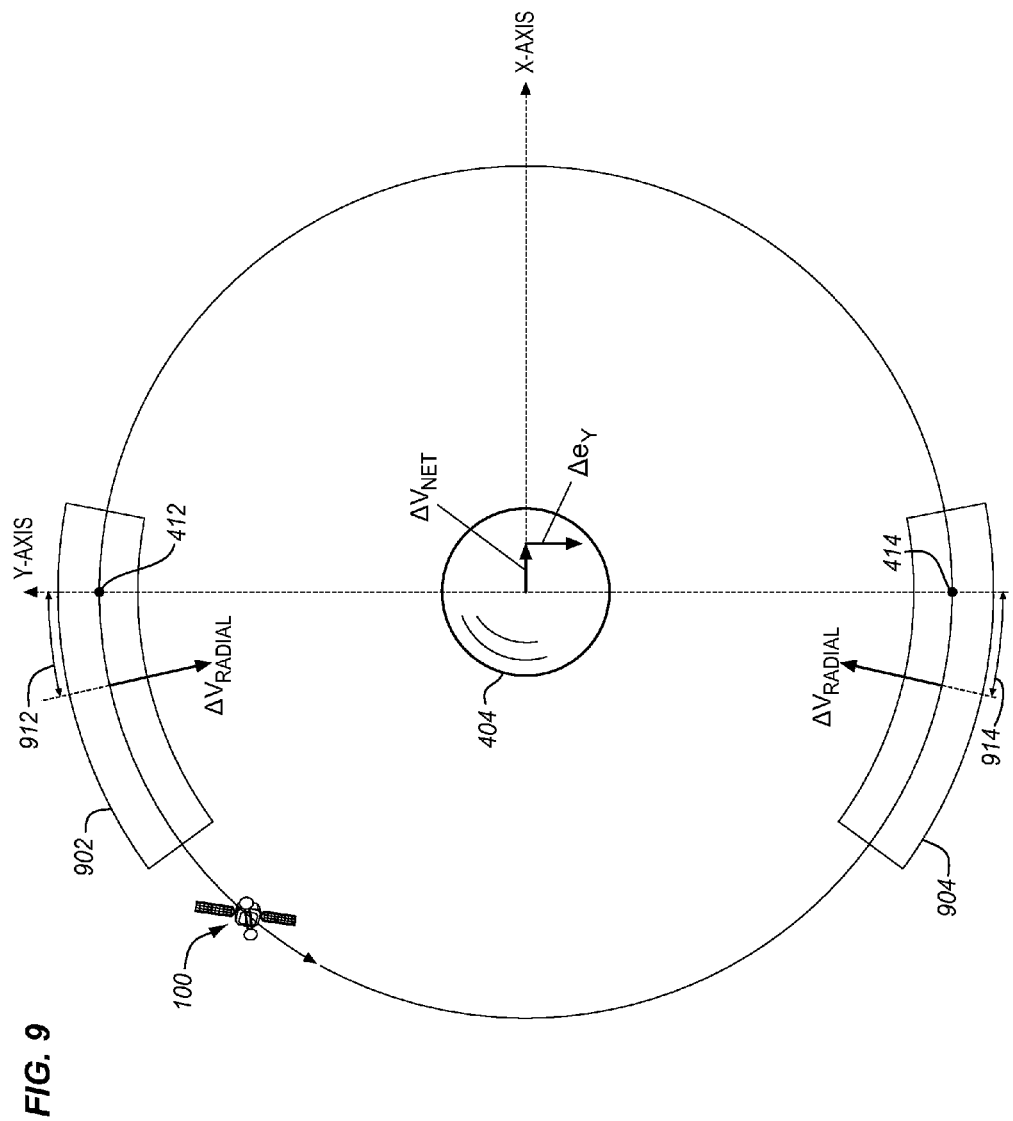
FIG. 9 illustrates an offset of a burn proximate to an ascending node and an offset of a burn proximate to a descending node in an exemplary embodiment.

To further produce a target $\Delta e$ based on the maneuvers, the burns proximate to the ascending node 412 and the descending node 414 may be shifted in time in relation to their respective orbital nodes. FIG. 9 illustrates an offset of the burn proximate to the ascending node 412 and an offset of the burn proximate to the descending node 414 in an exemplary embodiment. In this embodiment, a burn 902 of the north electric thruster 210 is shown proximate to the ascending node 412, and a burn 904 of the south electric thruster 211 is shown proximate to the descending node 414. The center of burn 902 is shifted from the ascending node 412 by an offset 912. The center of burn 902 is shown as being after the ascending node 412, but it may be before the ascending node 412 in other examples. The center of burn 904 is shifted from the descending node 414 by an offset 914. The center of burn 904 is shown as being before the descending node 414, but it may be after the descending node 414 in other examples. The offsets 912 and 914 may be defined by shifts in time, degrees, etc.

The difference in offsets of burns 902 and 904 produces a $\Delta e$ component substantially along the y-axis. The burn 902 of the north electric thruster 210 creates a $\Delta V_{radial}$ and the burn 904 of the south electric thruster 211 creates a $\Delta V_{radial}$. A net $\Delta V_{radial}$ is produced by the two maneuvers, which results in a $\Delta e$ component along the y-axis. The radial velocities would cancel if the burns were centered at the orbital nodes 412 and 414. When there is a variation between the offsets of the north electric thruster 210 and the south electric thruster 211, the $\Delta V_{radial}$ at the orbital nodes do not cancel, and a net $\Delta V_{radial}$ remains.

Figure 10:
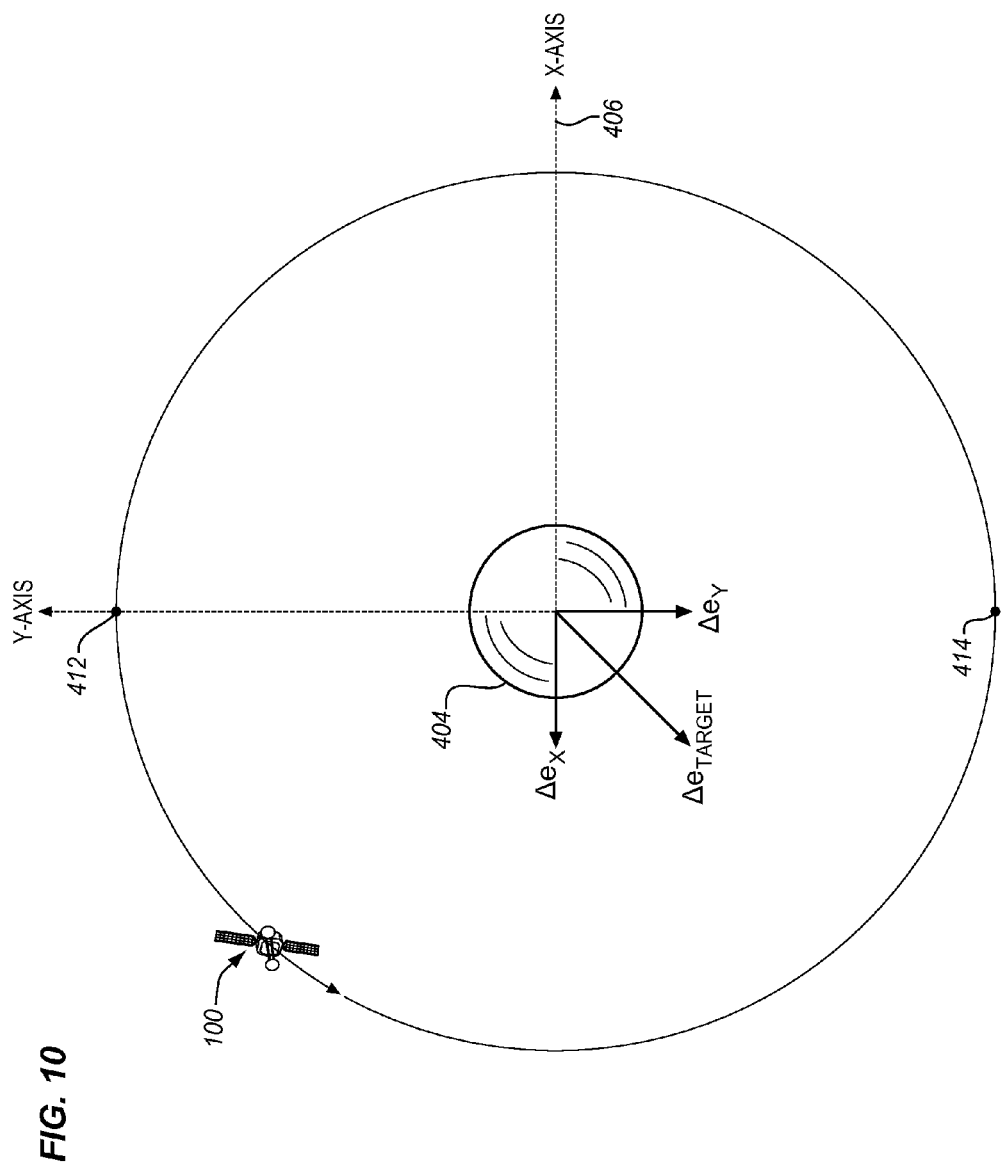
FIG. 10 illustrates a target Δe produced by stationkeeping maneuvers in an exemplary embodiment.

To produce the target $\Delta e$, orbit controller 120 may vary the burn durations between the orbital nodes to produce the $\Delta e$ component along the x-axis (or substantially along the x-axis). Also, orbit controller 120 may vary the offset of the burns proximate to the orbital nodes to produce the $\Delta e$ component along the y-axis (or substantially along the y-axis). The combination of these two variations can produce a net $\Delta V_{radial}$, which in turn produces the target $\Delta e$ ($\Delta e_{target} = \Delta e_x + \Delta e_y$) that can compensate for the eccentricity produced by solar radiation pressure and other perturbations. FIG. 10 illustrates the target $\Delta e$ produced by the stationkeeping maneuvers in an exemplary embodiment. Assume for FIG. 10 that the difference between burn durations produces a $\Delta e_x$ component and the difference in the offsets of the burns produces a $\Delta e_y$ component. The $\Delta e_x$ and the $\Delta e_y$ components add to create the target $\Delta e$. Orbit controller 120 can adjust the maneuvers so that the target $\Delta e$ points in a direction opposite the direction of the eccentricity vector produced by solar radiation pressure and other perturbations as shown in FIG. 7. Therefore, the stationkeeping maneuvers can compensate for the eccentricity produced by the Sun 702.

If the maneuvers performed by the electric thrusters 210-211 do not provide enough of a $\Delta V_{radial}$ to produce the target $\Delta e$, orbit controller 120 can also fire the west chemical thruster 220 and/or the east chemical thruster 221 to assist in producing the target $\Delta e$. The burns of chemical thrusters 220-221 may be performed at or near an orbital node, or may be performed at other locations along the orbit of satellite 100 based on the desired direction of the target $\Delta e$. To add to the $\Delta e$ component produced by the burns of electric thrusters 210-211, orbit controller 120 may control a burn of east chemical thruster 221 at a location along the orbit of satellite 100 which produces a $\Delta V_{tan}$ of satellite 100. The $\Delta V_{tan}$ produces a $\Delta e$ component due to the burn of east chemical thruster 221. Orbit controller 120 may also control a burn of west chemical thruster 220 at a location along the orbit of satellite 100 which produces another $\Delta V_{tan}$ of satellite 100. The $\Delta V_{tan}$ produces a $\Delta e$ component due to the burn of west chemical thruster 220. Orbit controller 120 selects the locations of the burns of chemical thrusters 220-221 so that the $\Delta e$ components from these burns add to the $\Delta e$ component from the burns of electric thrusters 210-211 to produce the target $\Delta e$.

Figure 11:
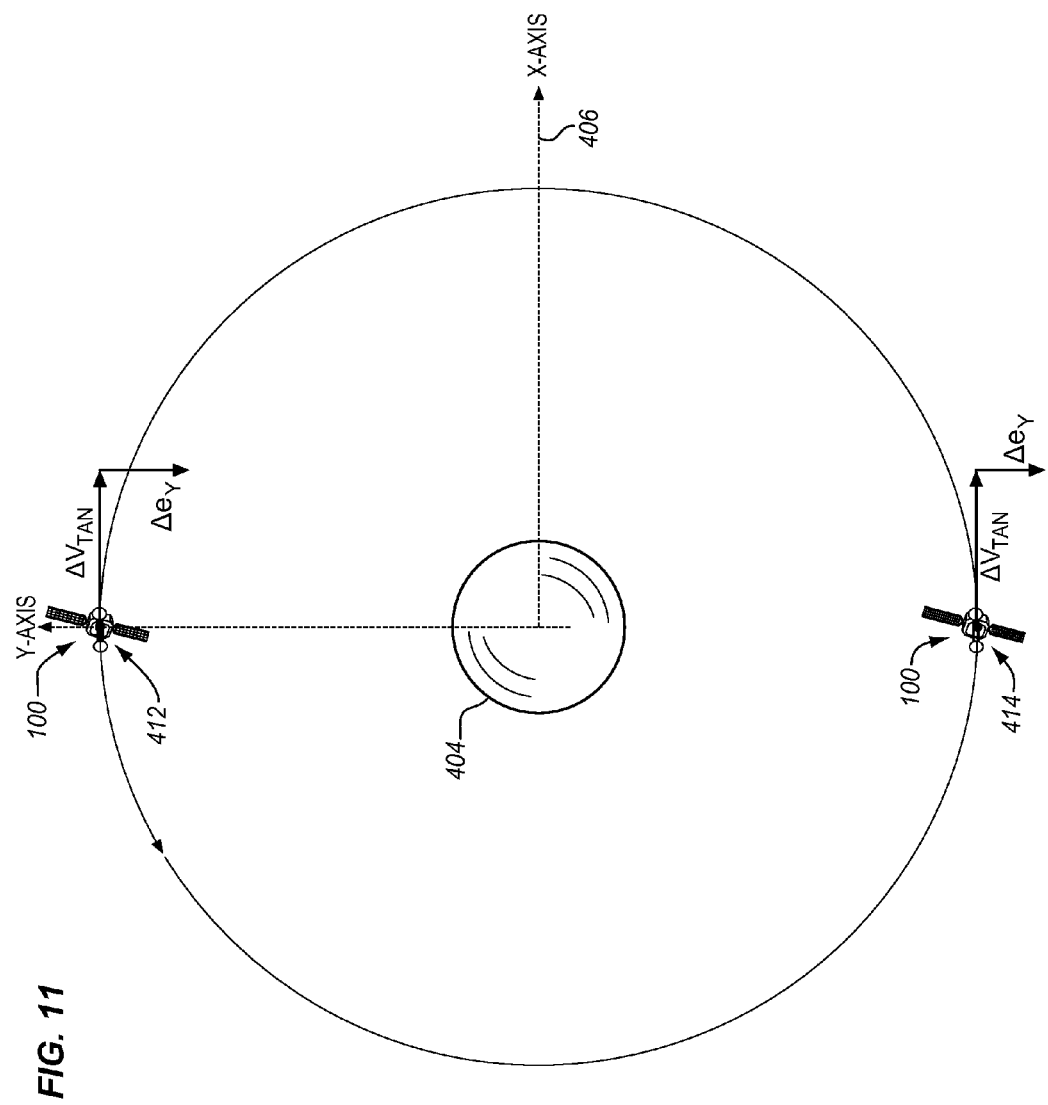
FIG. 11 illustrates a burn of chemical thrusters proximate to an ascending node and/or a descending node in an exemplary embodiment.

FIG. 11 illustrates a burn of a chemical thruster proximate to the ascending node 412 and/or the descending node 414 in an exemplary embodiment. A burn of the east chemical thruster 221 will produce a $\Delta V$ in the tangential direction. This $\Delta V$ is against the orbital motion of satellite 100 and is referred to as a retrograde burn. The $\Delta V_{tan}$ proximate to ascending node 412 is along the x-axis, which creates a $\Delta e$ component substantially along the y-axis. This $\Delta e_y$ component is added to the $\Delta e$ component due to the burns of the electric thrusters 210-211 to produce the target $\Delta e$. A burn of the west chemical thruster 220 will produce a $\Delta V$ in the tangential direction. This $\Delta V$ is with the orbital motion of satellite 100 and is referred to as a prograde burn. The $\Delta V_{tan}$ proximate to descending node 414 is along the x-axis, which creates a $\Delta e$ component substantially along the y-axis. This $\Delta e_y$ component is added to the $\Delta e$ component due to the burns of the electric thrusters 210-211 and the $\Delta e_y$ component due to the burn of the east chemical thruster 221 to produce the target $\Delta e$. The maneuvers shown in FIG. 11 are just one example to show how burns of one or more of the chemical thrusters 220-221 can add to the $\Delta e$ components produced by the burns of the electric thrusters 210-211.

Figure 12:
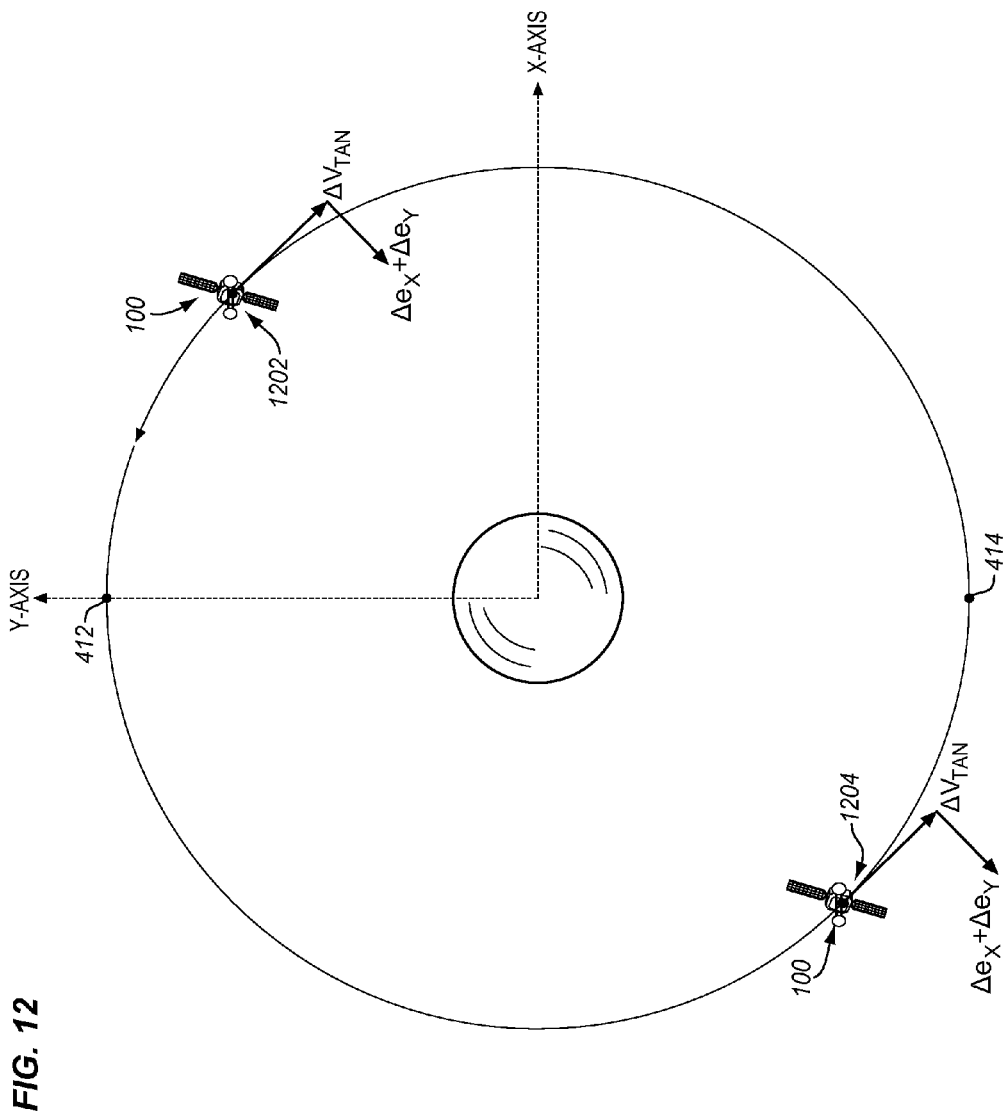
FIG. 12 illustrates a burn of a chemical thruster at locations along the orbit of the satellite in an exemplary embodiment.

FIG. 12 illustrates a burn of a chemical thruster at locations along the orbit of satellite 100 in an exemplary embodiment. The burn of west chemical thruster 220 and/or east chemical thruster 221 may be at virtually any location along the orbit. A burn of the east chemical thruster 221 will produce a $\Delta V_{tan}$ at a location 1202, which creates a $\Delta e_x$ component and a $\Delta e_y$ component. The $\Delta e_x$ and $\Delta e_y$ components may be added to the $\Delta e$ component due to the burns of the electric thrusters 210-211 to produce the target $\Delta e$. Likewise, a burn of the west chemical thruster 220 will produce a $\Delta V_{tan}$ at a location 1204, which creates a $\Delta e_x$ component and a $\Delta e_y$ component. The $\Delta e_x$ and $\Delta e_y$ components may be added to the $\Delta e$ component due to the burns of the electric thrusters 210-211, and the $\Delta e_x$ and $\Delta e_y$ components due to the burn of the east chemical thruster 221 to produce the target $\Delta e$. Locations 1202 and 1204 are typically 180° apart, but the locations may vary from 180° apart depending on the desired $\Delta e$ components. The maneuvers shown in FIG. 12 are just one example to show how burns of one or more of the chemical thrusters 220-221 can add to the $\Delta e$ components produced by the burns of the electric thrusters 210-211.

Figure 13:
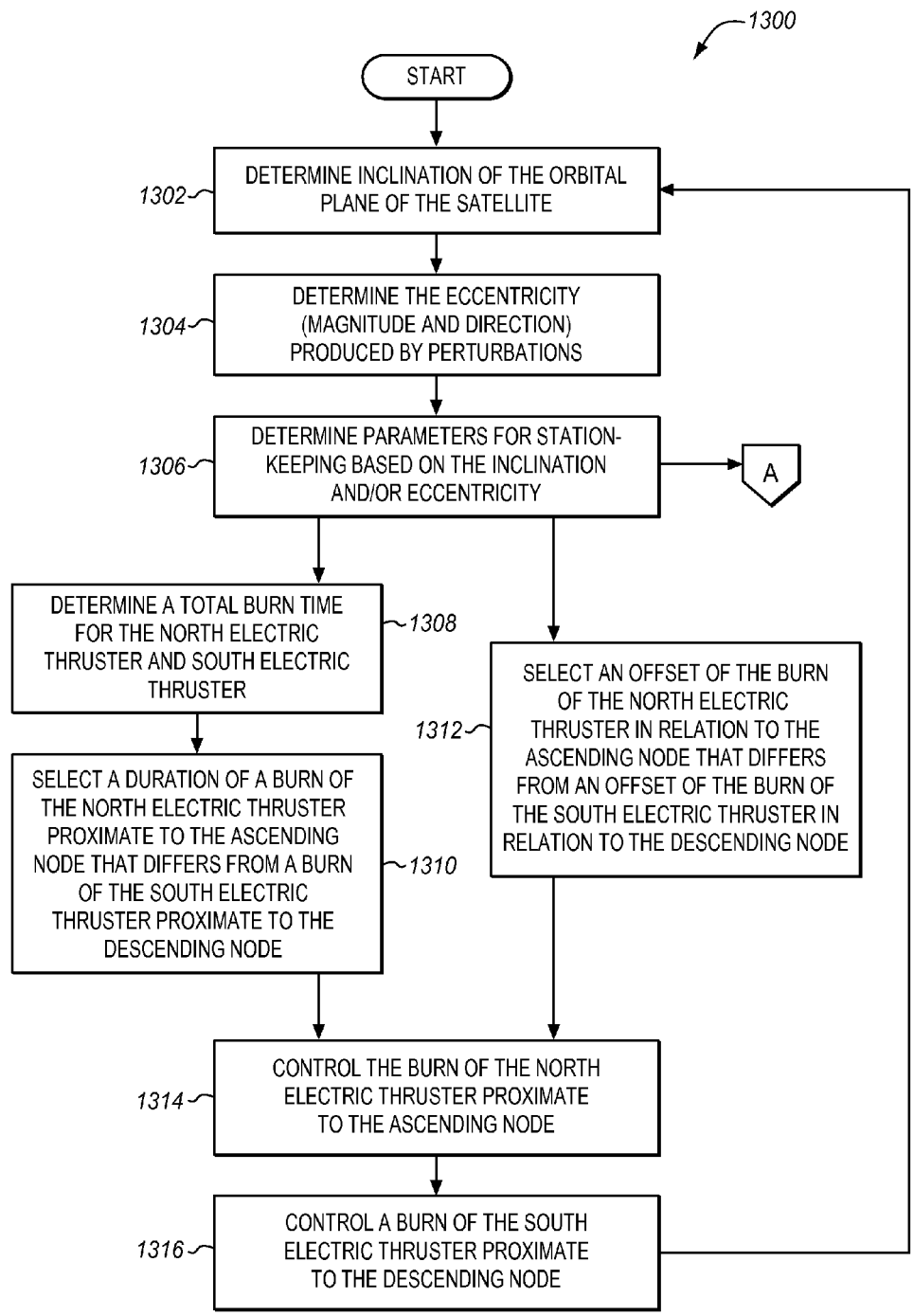
FIGS. 13-14 are flow charts illustrating a method for controlling stationkeeping maneuvers for a satellite in an exemplary embodiment.
Figure 14:
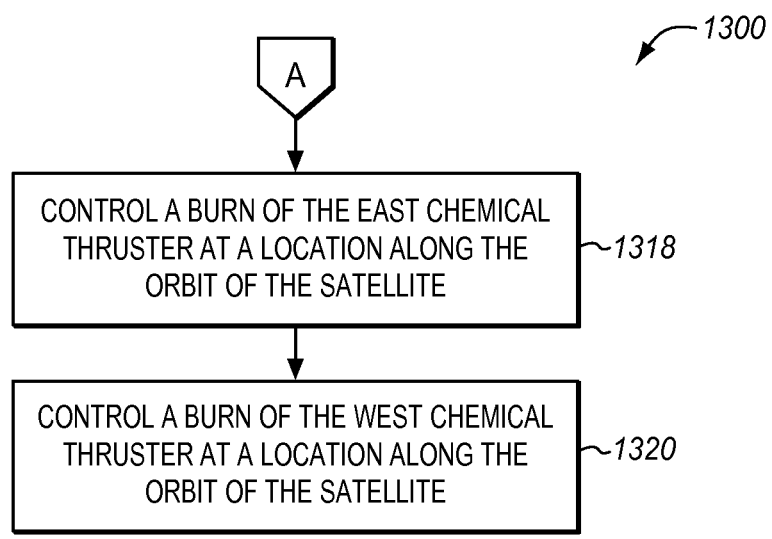

Orbit controller 120 may implement any combination of the maneuvers described above to produce a target $\Delta e$. An exemplary process for stationkeeping implemented by orbit controller 120 is shown in FIGS. 13-14. FIGS. 13-14 are flow charts illustrating a method 1300 for controlling stationkeeping maneuvers for satellite 100 in an exemplary embodiment. The steps of method 1300 will be described with respect to satellite 100 of FIGS. 1-3, although one skilled in the art will understand that the methods described herein may be performed for other satellites or systems not shown. The steps of the methods described herein are not all inclusive and may include other steps not shown. The steps for the flow charts shown herein may also be performed in an alternative order.

When initiating the stationkeeping maneuvers, orbit controller 120 may determine or identify the inclination of the orbital plane 408 of satellite 100 (step 1302). Orbit controller 120 may also determine, identify, or estimate an eccentricity produced by perturbations, such as solar radiation pressure (step 1304). As described above, the eccentricity from solar radiation pressure changes direction based on the location of the Sun. Thus, orbit controller 120 can estimate the direction and magnitude of the eccentricity produced by solar radiation pressure based on the time of year.

Orbit controller 120 then determines the parameters for the stationkeeping maneuvers to compensate for inclination of the orbital plane 408 and/or the eccentricity produced by perturbations, such as solar radiation pressure. In determining the parameters, orbit controller 120 determines a total burn time for the north electric thruster 210 and the south electric thruster 210 in combination (step 1308). The total burn time for the north electric thruster 210 and the south electric thruster 211 is calculated to compensate for the inclination of the orbital plane 408. Orbit controller 120 then partitions the total burn time into different burn durations proximate to the ascending node 412 and the descending node 414. When a burn is "proximate to" an orbital node, the burn is near or close to an orbital node. Orbit controller 120 selects a duration of a burn of the north electric thruster 210 proximate to the ascending node 412 that differs from a duration of a burn of the south electric thruster 211 proximate to the descending node 414 (step 1310). The difference in the burn durations proximate to the ascending and descending nodes creates a Δe component substantially along the x-axis (see FIG. 8).

Orbit controller 120 also determines when the burns are performed in relation to the orbital nodes. Orbit controller 120 selects an offset of the burn of the north electric thruster 210 in relation to the ascending node 412 that differs from an offset of the burn of the south electric thruster 211 in relation to the descending node 414 (step 1312). An offset indicates a shift of the center of a burn from an orbital node. In traditional stationkeeping maneuvers, burns were centered about the ascending node and the descending node. In this embodiment, the center of the burns of the north electric thruster 210 and the south electric thruster 211 may be shifted off-center of the orbital nodes in time, degrees, etc. The minimum offset for one of the burns is zero, and the maximum offset is limited by the duration of the burn and the amount of inclination correction desired. The difference in the burn offsets proximate to the ascending and descending nodes creates a Δe component substantially along the y-axis (see FIG. 9).

Orbit controller 120 then controls the burn of the north electric thruster 210 proximate to the ascending node 412 (step 1314), and controls the burn of the south electric thruster 211 proximate to the descending node 414 (step 1316). The burns of the electric thrusters 210-211 may be performed daily (or nearly daily over the period of a year or longer).

If the burns of the electric thrusters do not provide enough of a Δe component, then orbit controller 120 may control a burn of the west chemical thruster 220 and/or the east chemical thruster 221 as shown in FIG. 14. Orbit controller 120 may control a burn of east chemical thruster 221 at a location along the orbit of satellite 100 (step 1318), which produces a $\Delta V_{tan}$ of satellite 100. The $\Delta V_{tan}$ produces a Δe component due to the burn of east chemical thruster 221. Orbit controller 120 may additionally or alternatively control a burn of west chemical thruster 220 at a location along the orbit of satellite 100 (step 1320), which produces a $\Delta V_{tan}$ of satellite 100. The $\Delta V_{tan}$ produces a Δe component due to the burn of west chemical thruster 220. Orbit controller 120 selects the location of the burn of east chemical thruster 221 and/or the location of the burn of west chemical thruster 220 so that their Δe components add to the Δe component due to the burn of the electric thrusters 210-211. The addition of these Δe components compensate for the eccentricity due to perturbations.

A combination of burns as described above is able to produce a target Δe to compensate for perturbations. For example, to counteract the eccentricity caused by the Sun, the stationkeeping maneuvers described above can produce a target Δe that points about 90° behind the Sun. The target Δe points in an opposite direction than the eccentricity vector cause by the Sun. As the position of the Sun changes during the year, orbit controller 120 can adjust the stationkeeping maneuvers so the target Δe continues to point about 90° behind the Sun.

There may be instances where one of the electric thrusters 210-211 becomes inoperable. As can be seen in FIG. 2, satellite 100 may not have redundant north and south electric thrusters. Thus, a failure of one of the thrusters will not allow for burns at both the ascending node 412 and the descending node 414 as described above. If redundant thrusters are implemented, there may be instances where both of the north electric thrusters or both of the south electric thrusters fail. When a failure occurs, orbit controller 120 may transition into different stationkeeping maneuvers for the failure scenario as shown in FIG. 15.

Figure 15:
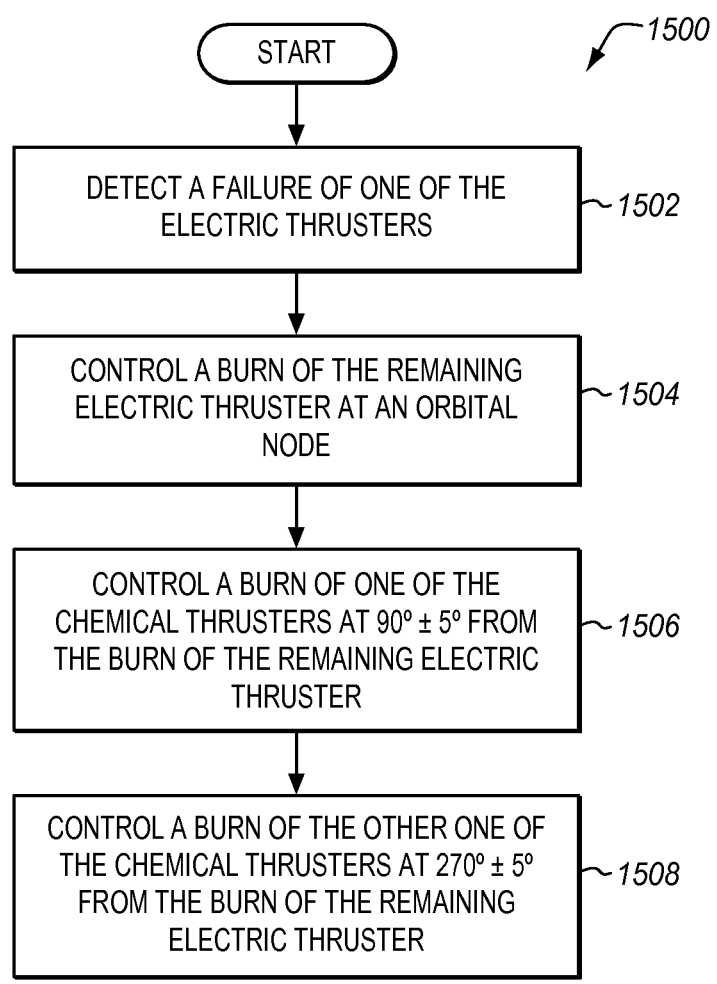
FIG. 15 is a flow chart illustrating a method for controlling stationkeeping maneuvers during a failure scenario in an exemplary embodiment.
Figure 16:
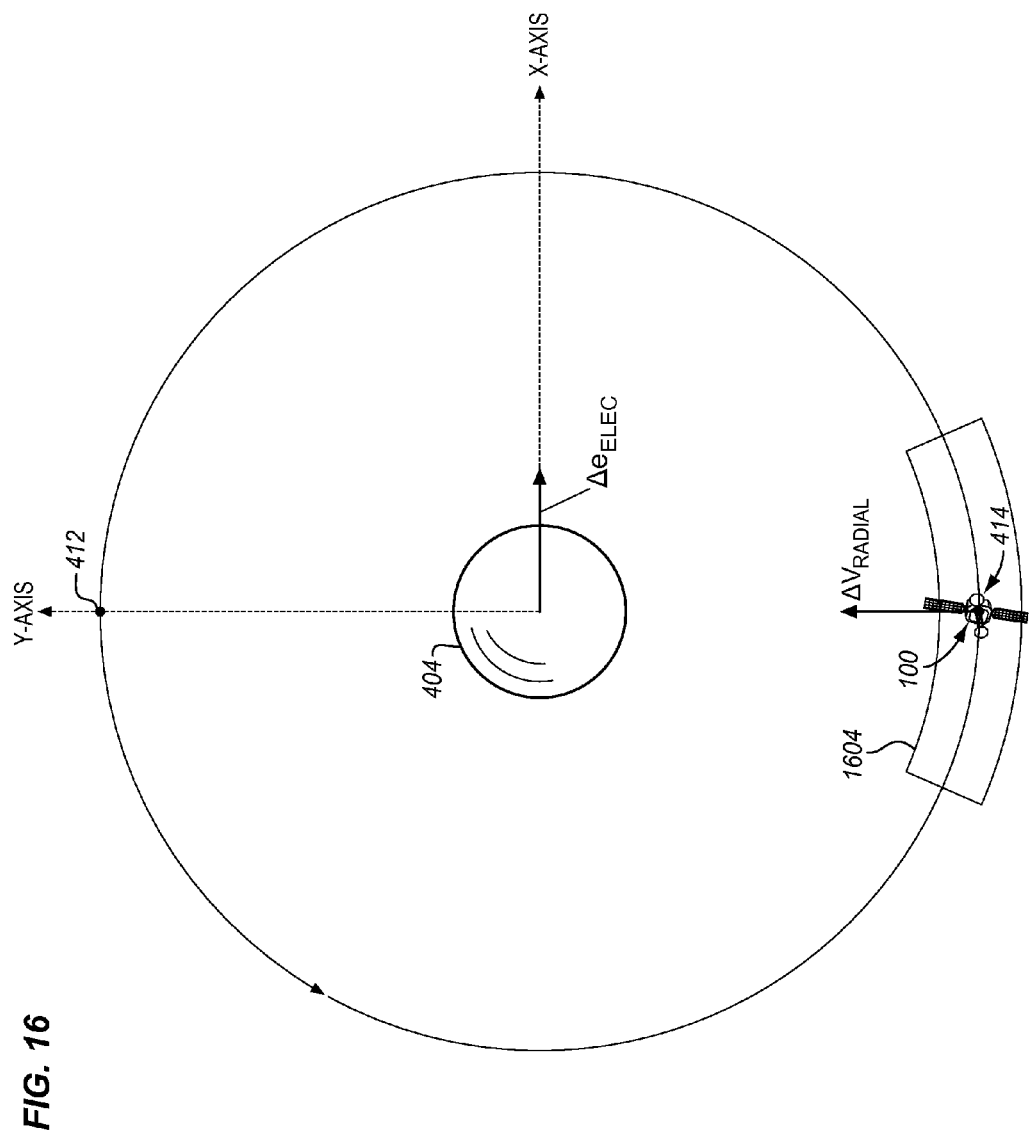
FIG. 16 illustrates a burn of a south electric thruster at a descending node in an exemplary embodiment.

FIG. 15 is a flow chart illustrating a method 1500 for controlling stationkeeping maneuvers during a failure scenario in an exemplary embodiment. Orbit controller 120 detects that one of the north electric thruster 210 or the south electric thruster 211 fails (step 1502). A failure of an electric thruster may make the thruster unable to provide any thrust or enough thrust for a maneuver. Orbit controller 120 also determines the parameters for the failure scenario maneuvers to compensate for inclination of the orbital plane 408, such as a total burn time to compensate for inclination of the orbital plane. Because only one electric thruster is operable, the total burn time is applied to the remaining electric thruster that is operable. A burn of the remaining electric thruster at its associated orbital node (i.e., ascending or descending) is generally sufficient to compensate for inclination. In the event that the burn on the remaining electric thruster is not sufficient, control of the inclination may be augmented with either a north or south chemical thruster 224-225 at its associated orbital node (i.e., ascending or descending). Orbit controller 120 controls a burn of the remaining electric thruster proximate to its associated orbital node (step 1504). Assume for one example that the north electric thruster 210 has failed. Orbit controller 120 will then control a burn of the south electric thruster 211 proximate to the descending node 414. FIG. 16 illustrates a burn of the south electric thruster 211 at the descending node 414 in an exemplary embodiment. In this embodiment, a burn 1604 of the south electric thruster 211 is shown at the descending node 414. The total burn time of thruster 211 is determined at least in part to compensate for the inclination of the orbital plane 408. For example, if the total burn time is 6 hours to compensate for inclination, then the time of burn 1602 of the south electric thruster 211 at the descending node 414 may be about 6 hours. The burn 1602 is shown as centered at the descending node 414. The burn of the remaining electric thruster may occur every day or nearly every day as needed for inclination control.

Because there is a burn of an electric thruster at only one orbital node, there is a residual $\Delta V_{radial}$ that produces a Δe component ($\Delta e_{ELEC}$) for the orbit of satellite 100 due to the burn of the remaining electric thruster. The Δe component is shown as along the x-axis in FIG. 16 assuming that the descending node 414 is at about 270°. To compensate for the Δe component produced by the burn at only one of the orbital nodes, orbit controller 120 controls a burn of one of the chemical thrusters 220-221 at 90° from the burn of the remaining electric thruster with a deviation of ±5° (step 1506), and controls a burn of the other chemical thruster 220-221 at 270° from the burn of the remaining electric thruster with a deviation of ±5° (step 1508). For example, if the burn of the remaining electric thruster is at or near right ascension of 270°, then the burn of one of the chemical thrusters 220-221 may be at right ascension of 0° and the burn of the other chemical thruster 220-221 may be at right ascension of 180°. Right ascension is the angular distance measured eastward along the celestial equator from the vernal equinox. The Sun is at right ascension of 0° at vernal equinox, at right ascension of 90° at summer solstice, at right ascension of 180° at autumnal (fall) equinox, and at right ascension of 270° at winter solstice. The angular distance of the burns of chemical thrusters 220-221 is an approximation that can vary within acceptable tolerances of orbital mechanics. For example, right ascension of 0° may mean 0°±a tolerance or deviation, such as 0°±1°, 0°±2°, etc. Similarly, right ascension of 180° may mean 180°±a tolerance or deviation, such as 180°±1°, 180°±2°, etc. The burns of chemical thrusters 220-221 may occur every few days as needed to compensate for the Δe caused by the burn at the remaining electric thruster 210-211.

Figure 17:
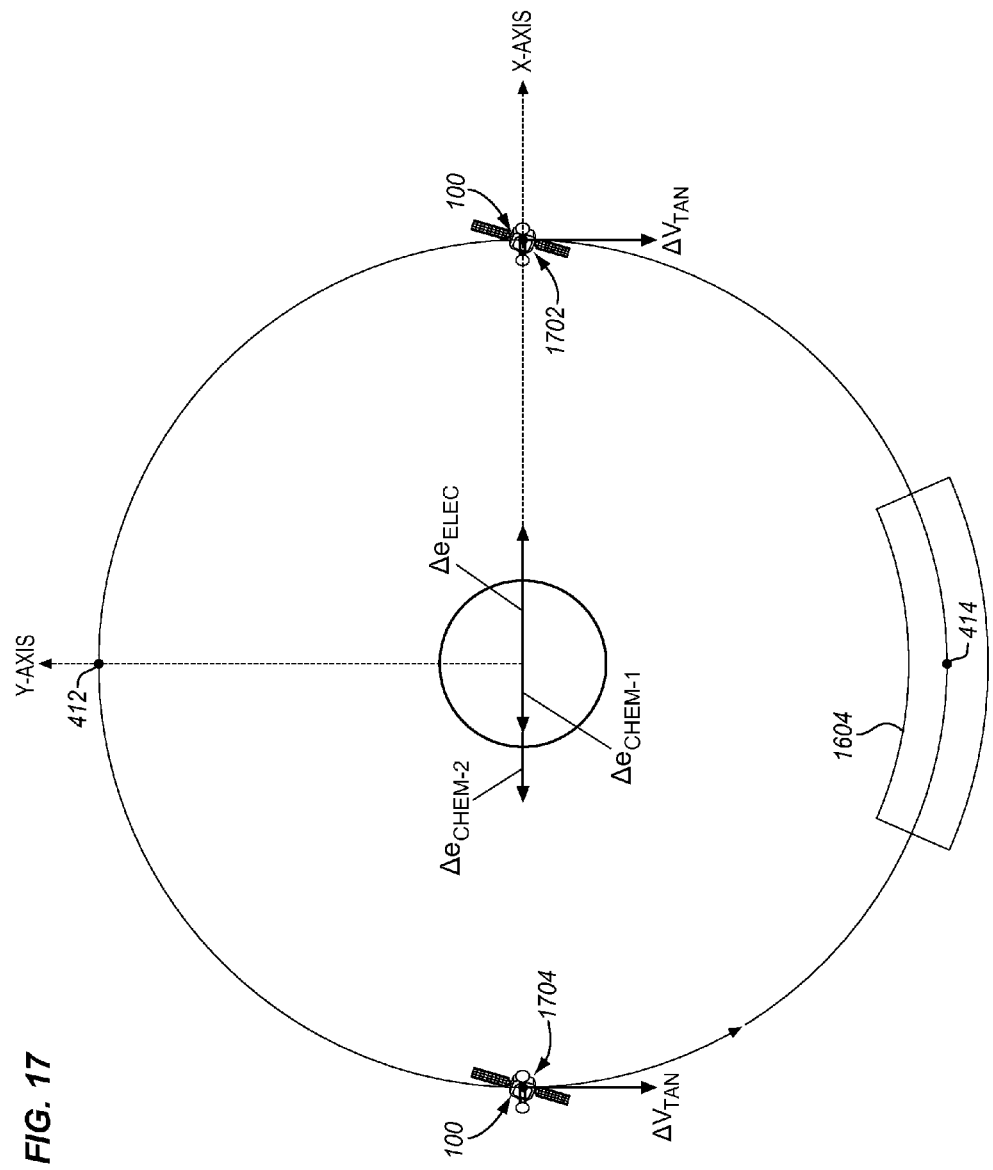
FIG. 17 illustrates maneuvers at 90° and 270° from the burn of the remaining electric thruster in an exemplary embodiment.

FIG. 17 illustrates maneuvers at 90° and 270° from the burn of the remaining electric thruster in an exemplary embodiment. As shown in FIG. 16, the burn 1604 of the south electric thruster 211 proximate to the descending node 414 produces a Δe component along the x-axis (shown as $\Delta e_{ELEC}$). Orbit controller 120 controls a retrograde burn 1702 of the east chemical thruster 221 about 90° from the burn of the south electric thruster 211, which is at or near right ascension of 0° in FIG. 17. The retrograde burn 1702 produces a velocity change ($\Delta V_{tan}$) tangential to, and in the opposite direction of, the movement of satellite 100. The $\Delta V_{tan}$ produces a Δe component (shown as $\Delta e_{CHEM-1}$) along the x-axis. Orbit controller 120 also controls a prograde burn 1704 of the west chemical thruster 220 about 270° from the burn of the south electric thruster 211, which is shown at or near right ascension of 180°. The prograde burn 1704 produces another velocity change ($\Delta V_{tan}$) tangential to, and in the same direction as, the movement of satellite 100. The $\Delta V_{tan}$ produces a Δe component (shown as $\Delta e_{CHEM-2}$) along the x-axis. The combination of the Δe components produced by the retrograde burn 1702 of east chemical thruster 221 and the prograde burn 1704 of west chemical thruster 220 act to compensate for the Δe component produced by the burn 1604 of the south electric thruster 211.

The burns at right ascension of 0° and at right ascension of 180° as shown in FIG. 17 are intended to provide a $\Delta V_{tan}$ that is along the y-axis. There may be instances where the chemical thrusters 220-221 are slighted canted and do not provide a $\Delta V_{tan}$ exactly parallel to the y-axis. In these instances, the burns may be moved off of right ascension of 0° and right ascension of 180° to compensate for the cant angle of the chemical thrusters 220-221. For example, if east chemical thruster 221 is canted by 1°, then the burn of east chemical thruster 221 may be moved to right ascension of 1° to compensate for the cant angle of the thruster and produce a $\Delta V_{tan}$ that is parallel to the y-axis (i.e., the deviation is 1° from right ascension of 0°). Similarly, if west chemical thruster 220 is canted by 2°, then the burn of west chemical thruster 220 may be moved to right ascension of 182° to compensate for the cant angle of the thruster and produce a $\Delta V_{tan}$ that is parallel to the y-axis (i.e., the deviation is 2° from right ascension of 180°). The deviation from right ascension of 0° and right ascension of 180° is based on the cant angles of the chemical thrusters.

Figure 18:
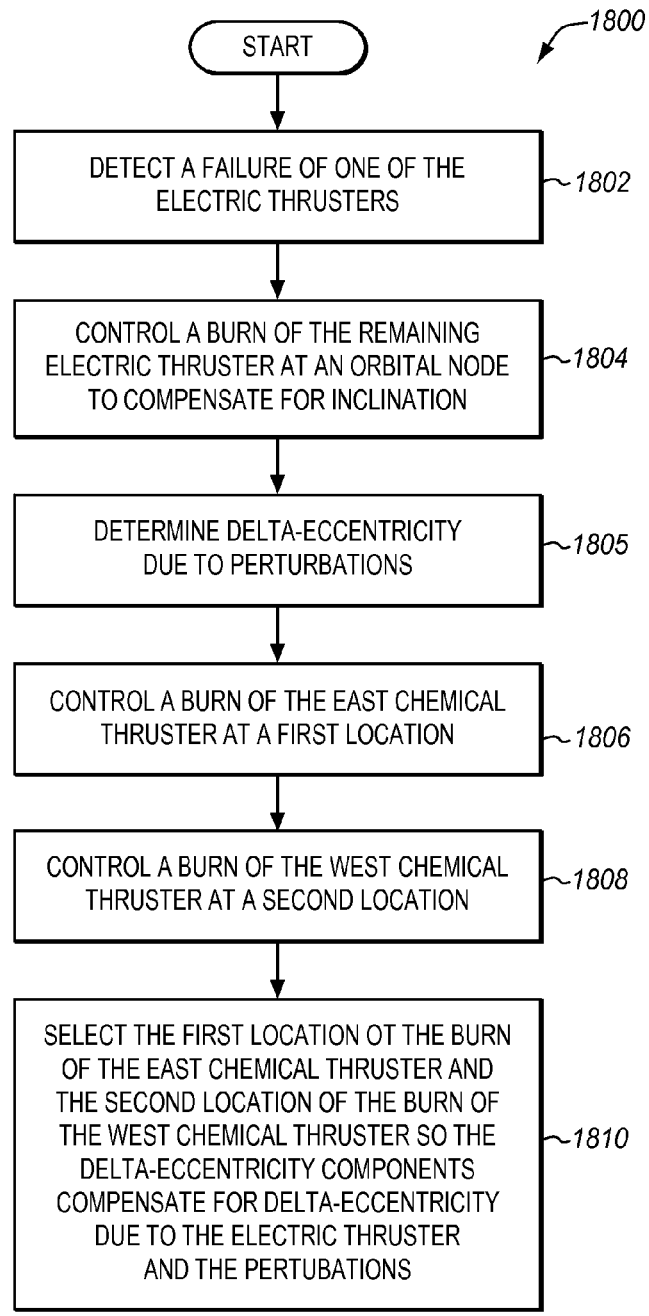
FIG. 18 is a flow chart illustrating a method for controlling stationkeeping maneuvers during a failure scenario in an exemplary embodiment.

The maneuvers at 90° and 270° from the burn of the remaining electric thruster are able to compensate for the Δe component produced by a burn of the remaining electric thruster. In another embodiment, burns of chemical thrusters 220-221 may also be used to compensate for a Δe component produced by perturbations, such as solar radiation pressure. FIG. 18 is a flow chart illustrating a method 1800 for controlling stationkeeping maneuvers during a failure scenario in an exemplary embodiment. As before, orbit controller 120 detects that one of the north electric thruster 210 or the south electric thruster 211 fails (step 1802). Orbit controller 120 then determines the parameters for the failure scenario maneuvers to compensate for inclination of the orbital plane 408 and/or the eccentricity caused by perturbations. In determining the parameters, orbit controller 120 may determine a total burn time to compensate for inclination of the orbital plane. Because only one electric thruster is operable, the total burn time is applied to the remaining electric thruster that is operable. A burn of the remaining electric thruster at its associated orbital node (i.e., ascending or descending) is generally sufficient to compensate for inclination. In the event that the burn of the remaining electric thruster is not sufficient, control of the inclination may be augmented with either a north or south chemical thruster 224-225 at its associated orbital node (i.e., ascending or descending). Orbit controller 120 controls a burn of the remaining electric thruster at its associated orbital node (step 1804). Assume for one example that the north electric thruster 210 fails. Orbit controller 120 will then control a burn of the south electric thruster 211 at the descending node 414 (see FIG. 16). The burn of the remaining electric thruster may occur every day or nearly every day as needed for inclination control.

Orbit controller 120 may also determine, identify, or estimate a Δe component due to perturbations affecting the orbit of satellite 100, such as solar radiation pressure (step 1805). As described above, the eccentricity from solar radiation pressure changes direction based on the location of the Sun. Thus, orbit controller 120 can estimate the direction and magnitude of the eccentricity vector produced by solar radiation pressure based on the time of year. Orbit controller 120 controls a burn of east chemical thruster 221 at a location along the orbit of satellite 100 (step 1806), which produces a $\Delta V_{tan}$ of satellite 100. The $\Delta V_{tan}$ produces a Δe component due to the burn of east chemical thruster 221. Orbit controller 120 also controls a burn of west chemical thruster 220 at a location along the orbit of satellite 100 (step 1808), which produces a $\Delta V_{tan}$ of satellite 100. The $\Delta V_{tan}$ produces a Δe component due to the burn of west chemical thruster 220. Orbit controller 120 selects the locations of the burns of east chemical thruster 221 and west chemical thruster 220 so that their Δe components compensate for the Δe component due to the burn of the remaining electric thruster and the Δe component due to the perturbations (step 1810).

The burns of the chemical thrusters 220-221 as described above are used to compensate for eccentricity changes. When only one electric thruster is available, there will be a residual Δe component from the burn of this electric thruster. The burns of the chemical thrusters 220-221 can be used to compensate for that residual Δe component. The burns of the chemical thrusters 220-221 can also be used to compensate for a Δe component produced by perturbations. Therefore, orbit controller 120 is able to select where the chemical thrusters 220-221 are fired to produce Δe components (magnitude and direction) that can compensate for a residual Δe component from a single electric thruster and/or a Δe component from perturbations.

Figure 19:
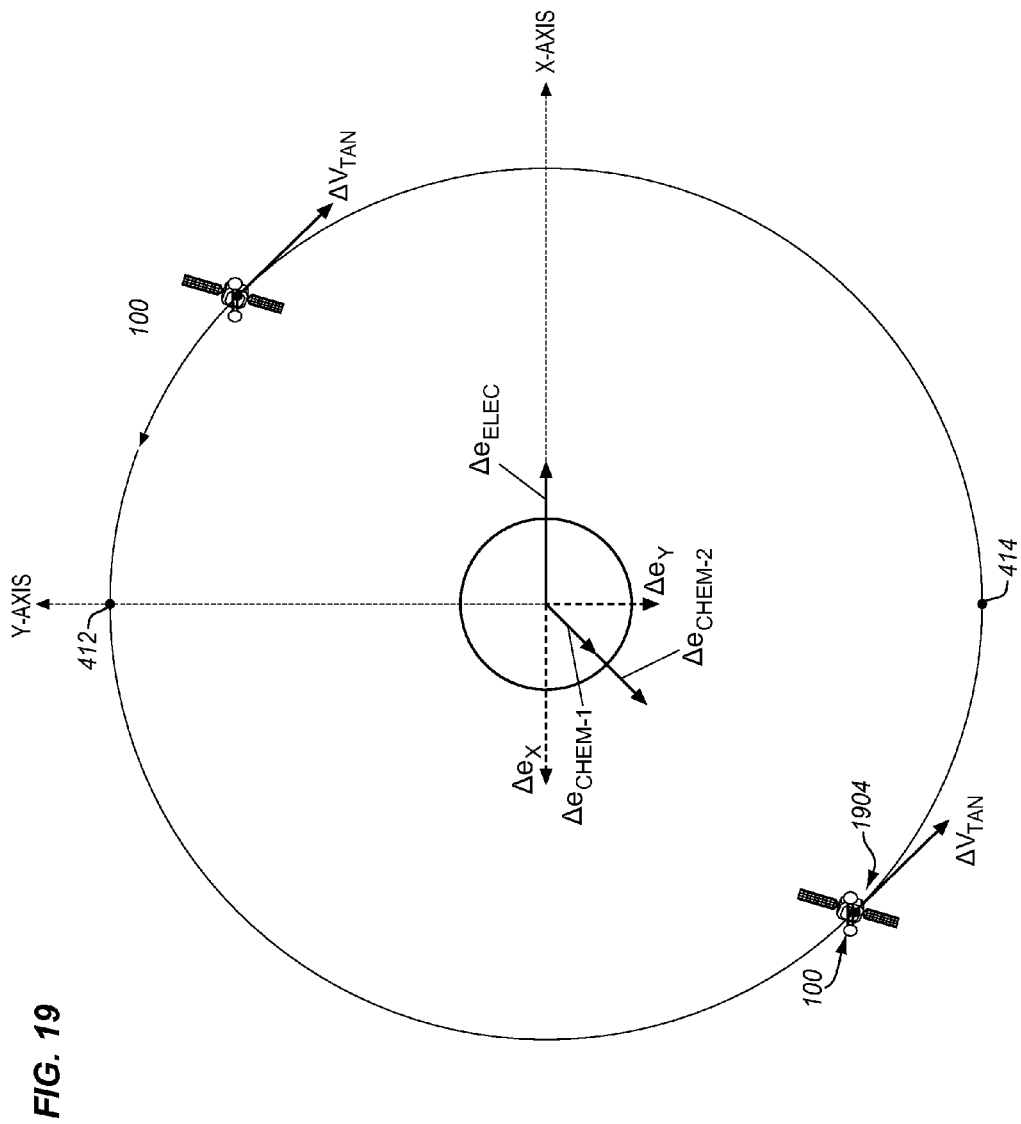
FIG. 19 illustrates a retrograde burn of the east chemical thruster and a prograde burn of the west chemical thruster in an exemplary embodiment.

The following describes different burns of the chemical thrusters 220-221 to compensate for unwanted Δe components. FIG. 19 illustrates a retrograde burn of the east chemical thruster 221 and a prograde burn of the west chemical thruster 220 in an exemplary embodiment. Again, the burn of the south electric thruster 211 produces a Δe component along the x-axis (shown in FIG. 19 as $\Delta e_{ELEC}$). The retrograde burn 1902 of the east chemical thruster 221 is shown as offset from right ascension of 0° by +30° (right ascension of 30°). The retrograde burn 1902 produces a velocity change ($\Delta V_{tan}$) tangential to, and in the opposite direction of, the movement of satellite 100. Because the $\Delta V_{tan}$ is not aligned with the y-axis, the $\Delta V_{tan}$ produces a Δe component (shown as $\Delta e_{CHEM-1}$) that has an x-component ($\Delta e_x$) and a y-component ($\Delta e_y$). The prograde burn 1904 of the west chemical thruster 220 is shown as offset from right ascension of 180° by +30° (right ascension of 210°). The prograde burn 1904 produces another velocity change ($\Delta V_{tan}$) tangential to, and in the direction of, the movement of satellite 100. Because the $\Delta V_{tan}$ is not aligned with the y-axis, the $\Delta V_{tan}$ produces a Δe component (shown as $\Delta e_{CHEM-2}$) that has an x-component and a y-component. The Δe component produced by the retrograde burn 1902 of east chemical thruster 221, the Δe component produced by the prograde burn 1904 of west chemical thruster 220, and the Δe component produced by the burn 1604 of the south electric thruster 211 (see FIG. 16) are added to produce a total or target Δe for the three maneuvers. In this instance, the Δe component from perturbations is the unwanted component.

Figure 20:
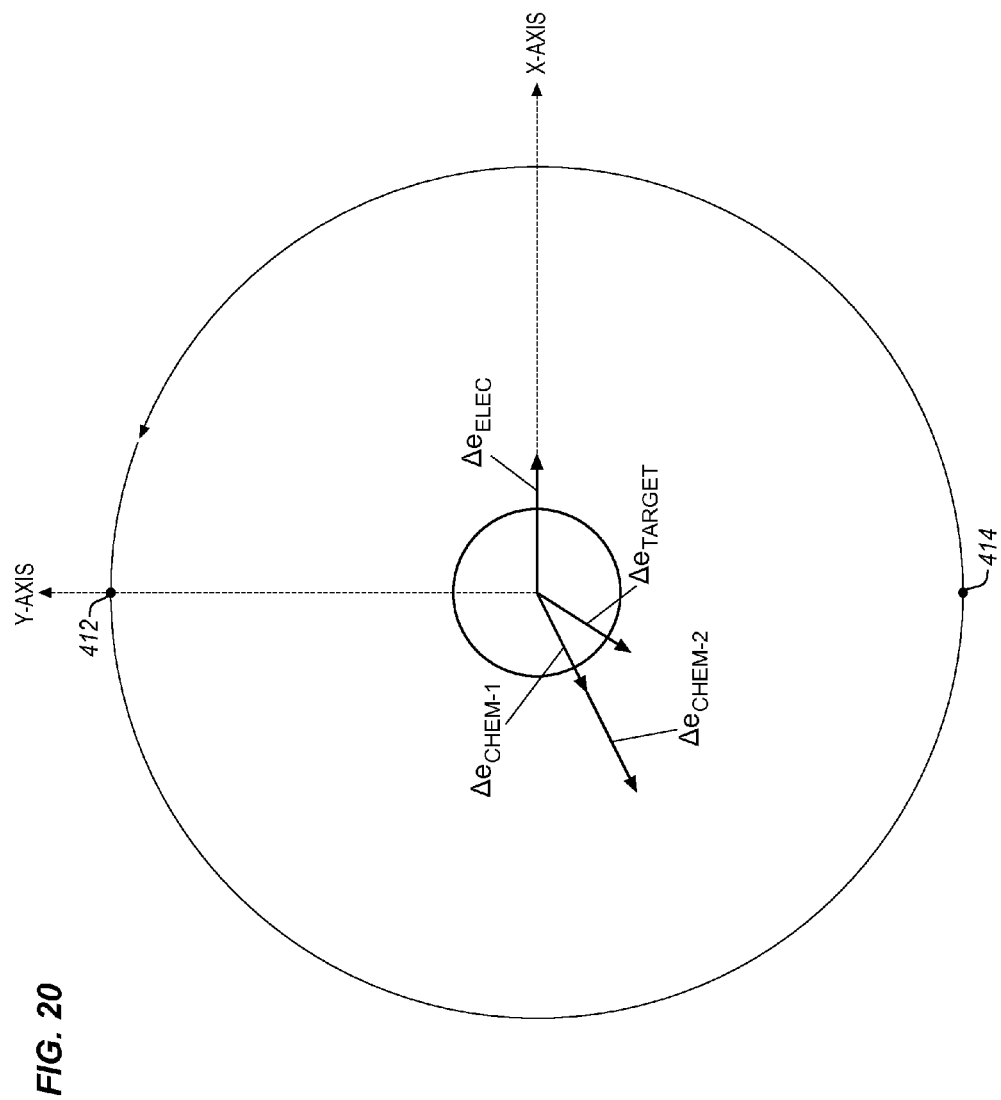
FIG. 20 illustrates a target Δe for the three maneuvers in an exemplary embodiment.

FIG. 20 illustrates a target Δe for the three maneuvers in an exemplary embodiment. When the $\Delta e_{CHEM-1}$, the $\Delta e_{CHEM-2}$, and the $\Delta e_{ELEC}$ are added, the target Δe is produced which may be used to compensate for perturbations. For example, to counteract the eccentricity caused by the Sun, the maneuvers can produce a target Δe that points about 90° behind the Sun. The target Δe points in an opposite direction than the eccentricity vector cause by the Sun. As the position of the Sun changes during the year, orbit controller 120 can adjust the maneuvers so the target Δe continues to point about 90° behind the Sun.

Another way to consider the above concept is that both the Δe component from perturbations and the Δe component from the burn of the south electric thruster 211 are unwanted components. Thus, the burns of the chemical thrusters 220-221 may be positioned so that the resulting Δe components of these burns are able to counteract the Δe components from the electric thruster and the perturbations.

Figure 21:
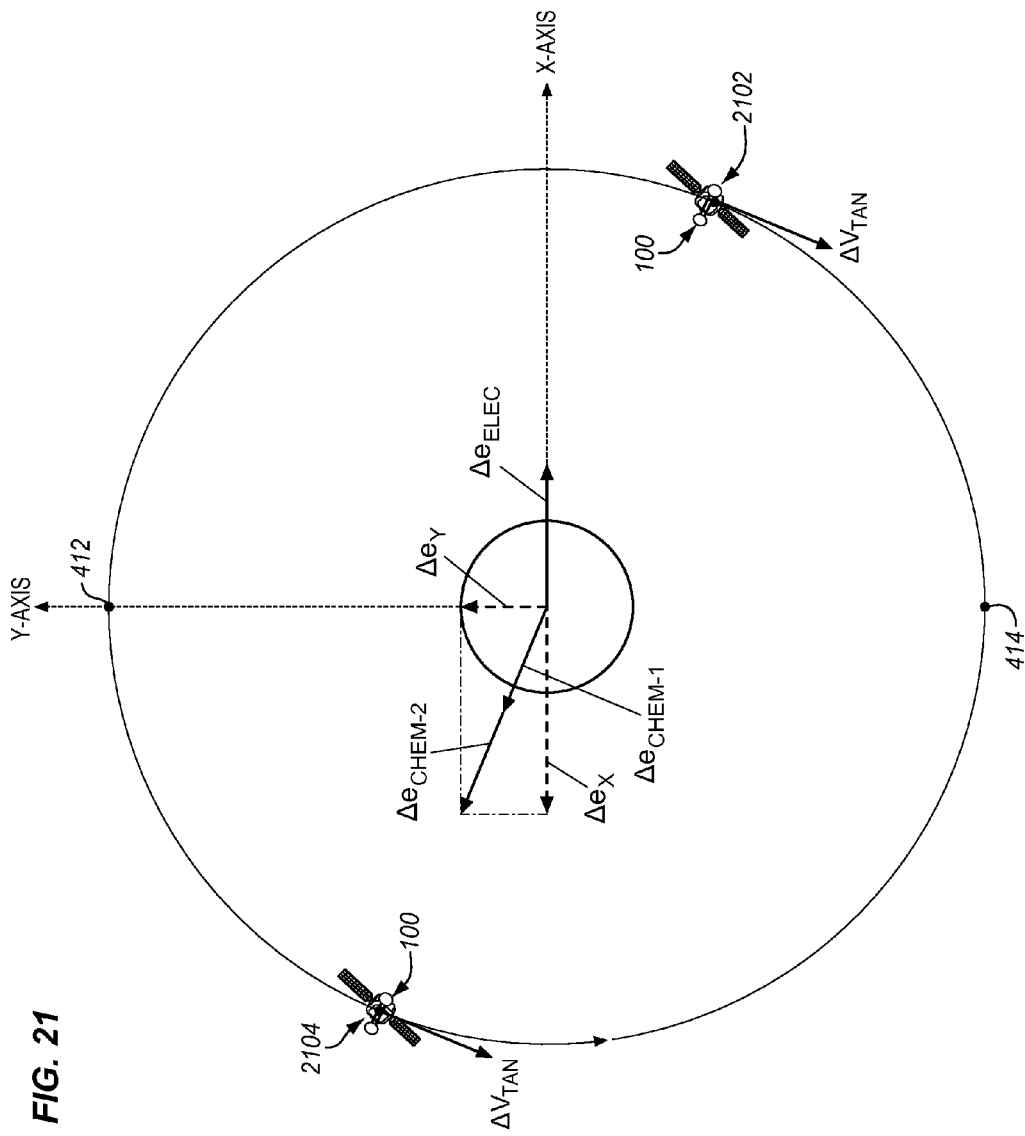
FIG. 21 illustrates a retrograde burn of the east chemical thruster and a prograde burn of the west chemical thruster in an exemplary embodiment.

FIG. 21 illustrates a retrograde burn of the east chemical thruster 221 and a prograde burn of the west chemical thruster 220 in an exemplary embodiment. In this example, the burn of the south electric thruster 211 produces a Δe component along the x-axis (shown in FIG. 21 as $\Delta e_{ELEC}$). The retrograde burn 2102 of the east chemical thruster 221 is shown as offset from right ascension of 0° by −20° (right ascension of 340°). The retrograde burn produces a velocity change ($\Delta V_{tan}$) tangential to, and in the opposite direction of, the movement of satellite 100. The $\Delta V_{tan}$ produces a Δe component (shown as $\Delta e_{CHEM-1}$) that has an x-component and a y-component. The prograde burn 2104 of the west chemical thruster 220 is shown as offset from right ascension of 180° by −20° (right ascension of 160°). The prograde burn 2104 produces another velocity change ($\Delta V_{tan}$) tangential to, and in the direction of, the movement of satellite 100. The $\Delta V_{tan}$ produces a Δe component (shown as $\Delta e_{CHEM-2}$) that has an x-component and a y-component. The Δe component produced by the retrograde burn 2102 of the east chemical thruster 221, the Δe component produced by the prograde burn 2104 of the west chemical thruster 220, and the Δe produced by the burn 1604 (see FIG. 16) of the south electric thruster 211 is added to produce a total or target Δe for the three maneuvers. In this instance, the Δe component from perturbations is the unwanted component. The burn of the south electric thruster 211 and the burns of the chemical thrusters 220-221 are able to counteract the Δe component from perturbations.

As can be seen in the FIGS. 19-21, burns of the chemical thrusters 220-221 may be performed at different points along the orbit of satellite 100 to produce a target Δe even though one of the electric thrusters 210-211 has failed. As a result, orbit controller 120 can compensate for eccentricity caused by perturbations, and keep satellite 100 in its box. Therefore, satellite 100 can stay in operation even though an electric thruster has failed.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:
1. An apparatus comprising:
an orbit controller configured to control stationkeeping maneuvers of a satellite, wherein the satellite comprises:
a satellite bus having a nadir side configured to face the Earth and a zenith side opposite the nadir side;
a north electric thruster installed toward a north region of the zenith side and oriented downward to produce thrust through a center of mass of the satellite;

a south electric thruster installed toward a south region of the zenith side and oriented upward to produce thrust through the center of mass of the satellite;

an east chemical thruster installed on an east side of the satellite bus to produce thrust through the center of mass of the satellite; and a west chemical thruster installed on a west side of the satellite bus to produce thrust through the center of mass of the satellite; and the orbit controller is configured to detect a failure of one of the electric thrusters, and in response to the failure, to:

determine a total burn time to compensate for inclination of an orbital plane of an orbit of the satellite;

control a burn of the remaining electric thruster proximate to one of an ascending node or a descending node for a duration of the total burn time;

control a burn of one of the chemical thrusters at 90°±5° from the burn of the remaining electric thruster; and control a burn of the other one of the chemical thrusters at 270°±5° from the burn of the remaining electric thruster.

2. The apparatus of claim 1 wherein:

the burn of the remaining electric thruster produces a radial velocity change of the satellite, wherein the radial velocity change produces a delta-eccentricity component for the orbit of the satellite due to the burn of the remaining electric thruster;

the burn of the one chemical thruster at 90°±5° produces a first tangential velocity change of the satellite, wherein the first tangential velocity change produces a delta-eccentricity component due to the burn of the one chemical thruster; and the burn of the other chemical thruster at 270°±5° produces a second tangential velocity change of the satellite, wherein the second tangential velocity change produces a delta-eccentricity component due to the burn of the other chemical thruster; and the delta-eccentricity components due to the burns of the chemical thrusters compensate for the delta-eccentricity component due to the burn of the remaining electric thruster.

3. The apparatus of claim 1 wherein:

the orbit controller is configured to detect a failure of the north electric thruster, and to control a burn of the south electric thruster at proximate to the descending node for the duration of the total burn time; and the orbit controller is configured to control a retrograde burn of the east chemical thruster at 90°±5° from the burn of the south electric thruster, and to control a prograde burn of the west chemical thruster at 270°±5° from the burn of the south electric thruster.

4. The apparatus of claim 1 wherein:

the orbit controller is configured to detect a failure of the south electric thruster, and to control a burn of the north electric thruster proximate to the ascending node for the duration of the total burn time; and the orbit controller is configured to control a retrograde burn of the east chemical thruster at 90°±5° from the burn of the north electric thruster, and to control a prograde burn of the west chemical thruster at 270°±5° from the burn of the north electric thruster.

5. The apparatus of claim 1 wherein:

the north electric thruster is oriented at a first angle from a north-south axis of the satellite, wherein the first angle is 35°±25°; and the south electric thruster is oriented at a second angle from the north-south axis of the satellite, wherein the second angle is 35°±25°.

6. The apparatus of claim 5 wherein:

the north electric thruster is gimbaled;

the south electric thruster is gimbaled; and the orbit controller is configured to adjust the first angle of the north electric thruster, and to adjust the second angle of the south electric thruster.

7. The apparatus of claim 5 wherein:

the north electric thruster is fixed at the first angle; and the south electric thruster is fixed at the second angle.

8. A method for controlling stationkeeping maneuvers for a satellite, wherein the satellite comprises a satellite bus having a nadir side and a zenith side, a north electric thruster installed toward a north region of the zenith side and oriented downward to produce thrust through a center of mass of the satellite, a south electric thruster installed toward a south region of the zenith side and oriented upward to produce thrust through the center of mass of the satellite, an east chemical thruster installed on an east side of the satellite bus to produce thrust through the center of mass of the satellite, and a west chemical thruster installed on a west side of the satellite bus to produce thrust through the center of mass of the satellite, the method comprising:

detecting a failure of one of the electric thrusters; and in response to the failure, determining a total burn time to compensate for inclination of an orbital plane of an orbit of the satellite;

controlling a burn of the remaining electric thruster proximate to one of an ascending node or a descending node for a duration of the total burn time;

controlling a burn of one of the chemical thrusters at 90°±5° from the burn of the remaining electric thruster; and controlling a burn of the other one of the chemical thrusters at 270°±5° from the burn of the remaining electric thruster.

9. The method of claim 8 wherein:

the burn of the remaining electric thruster produces a radial velocity change of the satellite, wherein the radial velocity change produces a delta-eccentricity component for the orbit of the satellite due to the burn of the remaining electric thruster;

the burn of the one chemical thruster at 90°±5° produces a first tangential velocity change of the satellite, wherein the first tangential velocity change produces a delta-eccentricity component due to the burn of the one chemical thruster; and the burn of the other chemical thruster at 270°±5° produces a second tangential velocity change of the satellite, wherein the second tangential velocity change produces a delta-eccentricity component due to the burn of the other chemical thruster; and the delta-eccentricity components due to the burns of the chemical thrusters compensate for the delta-eccentricity component due to the burn of the remaining electric thruster.

10. The method of claim 8 wherein:

detecting a failure of one of the electric thrusters comprises detecting a failure of the north electric thruster; and controlling the burns comprises:

controlling a burn of the south electric thruster proximate to the descending node for the duration of the total burn time;

controlling a retrograde burn of the east chemical thruster at 90°±5° from the burn of the south electric thruster; and controlling a prograde burn of the west chemical thruster at 270°±5° from the burn of the south electric thruster.

11. The method of claim 8 wherein:

detecting a failure of one of the electric thrusters comprises detecting a failure of the south electric thruster; and controlling the burns comprises:

controlling a burn of the north electric thruster proximate to the ascending node for the duration of the total burn time;

controlling a retrograde burn of the east chemical thruster at 90°±5° from the burn of the north electric thruster; and controlling a prograde burn of the west chemical thruster at 270°±5° from the burn of the north electric thruster.

12. An apparatus comprising:

an orbit controller configured to control stationkeeping maneuvers of a satellite, wherein the satellite comprises:

a satellite bus having a nadir side configured to face the Earth and a zenith side opposite the nadir side;

a north electric thruster installed toward a north region of the zenith side and oriented downward to produce thrust through a center of mass of the satellite;

a south electric thruster installed toward a south region of the zenith side and oriented upward to produce thrust through the center of mass of the satellite;

an east chemical thruster installed on an east side of the satellite bus to produce thrust through the center of mass of the satellite; and a west chemical thruster installed on a west side of the satellite bus to produce thrust through the center of mass of the satellite; and the orbit controller is configured to detect a failure of one of the electric thrusters, and in response to the failure, to:

determine a total burn time to compensate for inclination of an orbital plane of an orbit of the satellite;

control a burn of the remaining electric thruster proximate to one of an ascending node or a descending node for a duration of the total burn time which produces a radial velocity change of the satellite, wherein the radial velocity change produces a delta-eccentricity component for the orbit of the satellite due to the burn of the remaining electric thruster;

determine a delta-eccentricity component due to perturbations affecting the orbit of the satellite;

control a burn of the east chemical thruster at a first location along the orbit of the satellite which produces a first tangential velocity change of the satellite, wherein the first tangential velocity change produces a delta-eccentricity component due to the burn of the east chemical thruster; and control a burn of the west chemical thruster at a second location along the orbit of the satellite which produces a second tangential velocity change of the satellite, wherein the second tangential velocity change produces a delta-eccentricity component due to the burn of the west chemical thruster;

wherein the orbit controller is configured to select the first location of the burn of the east chemical thruster and the second location of the burn of the west chemical thruster so that the delta-eccentricity component due to the burn of the east chemical thruster and the delta-eccentricity component due to the burn of the west chemical thruster compensate for the delta-eccentricity component due to the burn of the remaining electric thruster and the delta-eccentricity component due to the perturbations.

13. The apparatus of claim 12 wherein:

the orbit controller is configured to determine a position of the Sun based on time of year, and to determine the delta-eccentricity component due to the perturbations based on the position of the Sun.

14. The apparatus of claim 12 wherein:

the north electric thruster is oriented at a first angle from a north-south axis of the satellite, wherein the first angle is 35°±25°; and the south electric thruster is oriented at a second angle from the north-south axis of the satellite, wherein the second angle is 35°±25°.

15. The apparatus of claim 14 wherein:

the north electric thruster is gimbaled;

the south electric thruster is gimbaled; and the orbit controller is configured to adjust the first angle of the north electric thruster, and to adjust the second angle of the south electric thruster.

16. The apparatus of claim 14 wherein:

the north electric thruster is fixed at the first angle; and the south electric thruster is fixed at the second angle.

17. A method for controlling stationkeeping maneuvers for a satellite, wherein the satellite comprises a satellite bus having a nadir side and a zenith side, a north electric thruster installed toward a north region of the zenith side and oriented downward to produce thrust through a center of mass of the satellite, a south electric thruster installed toward a south region of the zenith side and oriented upward to produce thrust through the center of mass of the satellite, an east chemical thruster installed on an east side of the satellite bus to produce thrust through the center of mass of the satellite, and a west chemical thruster installed on a west side of the satellite bus to produce thrust through the center of mass of the satellite, the method comprising:

detecting a failure of one of the electric thrusters; and in response to the failure, determining a total burn time to compensate for inclination of an orbital plane of an orbit of the satellite;

controlling a burn of the remaining electric thruster proximate to one of an ascending node or a descending node for a duration of the total burn time which produces a radial velocity change of the satellite, wherein the radial velocity change produces a delta-eccentricity component for the orbit of the satellite due to the burn of the remaining electric thruster;

determining a delta-eccentricity component due to perturbations affecting the orbit of the satellite;

controlling a burn of the east chemical thruster at a first location along the orbit of the satellite which produces a first tangential velocity change of the satellite, wherein the first tangential velocity change produces a delta-eccentricity component due to the burn of the east chemical thruster; and controlling a burn of the west chemical thruster at a second location along the orbit of the satellite which produces a second tangential velocity change of the satellite, wherein the second tangential velocity change produces a delta-eccentricity component due to the burn of the west chemical thruster;

wherein the first location of the burn of the east chemical thruster and the second location of the burn of the west chemical thruster are selected so that the delta-eccentricity component due to the burn of the east chemical thruster and the delta-eccentricity component due to the burn of the west chemical thruster compensate for the delta-eccentricity component due to the burn of the remaining electric thruster and the delta-eccentricity component due to the perturbations.

18. The method of claim 17 further comprising:
determining a position of the Sun based on time of year; and
determining the delta-eccentricity component due to the perturbations based on the position of the Sun.

* * * * *